United States Patent
Pan

(10) Patent No.: US 10,084,713 B2
(45) Date of Patent: Sep. 25, 2018

(54) PROTOCOL TYPE IDENTIFICATION METHOD AND APPARATUS

(71) Applicant: Huawei Technologies Co., Ltd., Shenzhen, Guangdong (CN)

(72) Inventor: Nengyi Pan, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 67 days.

(21) Appl. No.: 15/338,105

(22) Filed: Oct. 28, 2016

(65) Prior Publication Data

US 2017/0048155 A1 Feb. 16, 2017

Related U.S. Application Data

(63) Continuation of application No. PCT/CN2015/072529, filed on Feb. 9, 2015.

(30) Foreign Application Priority Data

Apr. 29, 2014 (CN) .......................... 2014 1 0177705

(51) Int. Cl.
*H04L 12/851* (2013.01)
*H04L 29/06* (2006.01)
*H04L 29/08* (2006.01)

(52) U.S. Cl.
CPC .......... *H04L 47/2483* (2013.01); *H04L 29/06* (2013.01); *H04L 67/02* (2013.01); *H04L 67/22* (2013.01); *H04L 67/303* (2013.01); *H04L 67/42* (2013.01); *H04L 69/16* (2013.01); *H04L 69/22* (2013.01)

(58) Field of Classification Search
CPC ....... G06F 17/30592; Y10S 707/99932; Y10S 707/99943; Y10S 707/99933; Y10S 707/99942
See application file for complete search history.

(56) References Cited

U.S. PATENT DOCUMENTS

| | | |
|---|---|---|
| 2007/0044147 A1 | 2/2007 | Choi et al. |
| 2007/0263548 A1 | 11/2007 | Oguchi et al. |
| 2011/0019574 A1 | 1/2011 | Malomsoky et al. |

FOREIGN PATENT DOCUMENTS

| | | |
|---|---|---|
| CN | 101202652 A | 6/2008 |
| CN | 101645806 A | 2/2010 |
| CN | 101873259 A | 10/2010 |
| CN | 102075404 A | 5/2011 |

(Continued)

*Primary Examiner* — Chandrahas B Patel

(57) ABSTRACT

The present invention relates to a protocol type identification method and apparatus. The method includes: acquiring a data packet transmitted on a connection that is established between a user terminal and a server; if multidimensional user information corresponding to the user terminal exists in a multidimensional user information table, performing, according to information that is identified by the found multidimensional user information and about all connections that are currently established by the user terminal, multidimensional user information based protocol type identification on the connection; and if the multidimensional user information corresponding to the user terminal is not found, performing, according to a packet characteristic of the data packet, data flow based protocol type identification on the connection on which the data packet is transmitted.

9 Claims, 7 Drawing Sheets

(56) References Cited

FOREIGN PATENT DOCUMENTS

| | | | |
|---|---|---|---|
| CN | 102523196 A | | 6/2012 |
| CN | 103023670 A | * | 4/2013 |
| CN | 103023670 A | | 4/2013 |
| CN | 103297270 A | | 9/2013 |
| CN | 103916294 A | | 7/2014 |
| EP | 2560338 A1 | | 2/2013 |

* cited by examiner

PROTOCOL TYPE IDENTIFICATION METHOD AND APPARATUS

CROSS-REFERENCE TO RELATED APPLICATIONS

This application is a continuation of International Application No. PCT/CN2015/072529, filed on Feb. 9, 2015, which claims priority to Chinese Patent Application No. 201410177705.0, filed on Apr. 29, 2014, the disclosures of the aforementioned applications are hereby incorporated by reference in their entireties.

TECHNICAL FIELD

The present invention relates to network traffic management technologies, and in particular, to a protocol type identification method and apparatus.

BACKGROUND

A packet may be deeply analyzed by using a deep packet inspection (Deep Packet Inspection, DPI) technology to identify the packet. In addition to performing an analysis on content of L2 (data link layer), L3 (network layer), and L4 (transmission layer) of the packet, an analysis on content of L7 (application layer) is further performed by DPI to identify various real applications and content of the applications, and therefore DPI is applied to application scenarios such as network optimization and traffic control.

In the prior art, DPI generally identify a packet based on a data flow, in other words, a single data flow is used as an object to be processed in DPI. After a flow table query is performed on the data flow, packets in the data flow are scanned by using various identification methods, such as characteristic identification, port classification, and a statistical method, to implement identification and classification of the flow. Identification of each flow is an independent process, and an identification result is saved based on flows.

A disadvantage of a flow-based identification method is as follows: packet content in each data flow is scanned within a range of the flow to implement identification and protocol classification, but a correlation between data flows is not utilized, and therefore performance of data flow identification is low, and precise service control on a per user basis cannot be implemented.

SUMMARY

Embodiments of the present invention provide a protocol type identification method and apparatus, so as to improve efficiency in identifying a protocol of a data flow.

According to a first aspect, an embodiment of the present invention provides a protocol type identification method, and the method includes:

acquiring a data packet transmitted on a connection that is established between a user terminal and a server;

querying whether multidimensional user information corresponding to the user ten final exists in a multidimensional user information table, where the multidimensional user information is used to indicate information about all connections that are currently established by the user terminal;

if the multidimensional user information corresponding to the user terminal is found, performing, according to information that is identified by the acquired multidimensional user information and about all connections that are currently established by the user terminal, multidimensional user information based protocol type identification on the connection on which the data packet is transmitted; and if the multidimensional user information corresponding to the user terminal is not found, performing, according to a packet characteristic of the data packet, data flow based protocol type identification on the connection on which the data packet is transmitted.

In a first possible implementation manner, the querying whether multidimensional user information corresponding to the user terminal exists in a multidimensional user information table includes: querying, according to user terminal address information in the data packet, whether the multidimensional user information corresponding to the user terminal address information exists in the multidimensional user information table.

According to the first possible implementation manner of the first aspect, in a second possible implementation manner, after the querying whether multidimensional user information corresponding to the user terminal exists in a multidimensional user information table, the method further includes: if the multidimensional user information corresponding to the user terminal does not exist in the multidimensional user information table, adding the multidimensional user information corresponding to the user terminal to the multidimensional user information table.

With reference to the first aspect, in a third possible implementation manner, the multidimensional user information corresponding to the user terminal includes at least one item of the following information: source IP address information and destination IP address information that are corresponding to current existing connections of the user terminal, user terminal address information of existing connections of the user terminal, address information of servers that were accessed by the user terminal, a protocol list of the user terminal, and behavior characteristic information of existing connections of the user terminal; the multidimensional user information table includes the multidimensional user information and a correspondence between the multidimensional user information and protocol types of existing connections of the user terminal.

With reference to the third possible implementation manner of the first aspect, in a fourth possible implementation manner, the performing, according to information that is identified by the acquired multidimensional user information and about all connections that are currently established by the user terminal, multidimensional user information based protocol type identification on the connection on which the data packet is transmitted includes: determining whether server address information in a 5-tuple of the data packet is included in the address information that is stored in the multidimensional user information table and of servers that were accessed by the user terminal, where if yes, a protocol type of the connection on which the data packet is transmitted is a protocol type corresponding to an existing connection that is stored in the multidimensional user information table and whose server address information is consistent with that of the data packet; or determining whether source IP address information and destination IP address information in a 5-tuple of the data packet are included in the source IP address information and the destination IP address information that are stored in the multidimensional user information table and corresponding to existing connections of the user terminal, and if yes, continuing to determine whether characteristic information of the data packet is included in the behavior characteristic information that is stored in the multidimensional user information table and of existing connections of the user terminal, where if yes, a protocol type of the connection on which the data packet is transmitted is a protocol type corresponding to an existing connection that is stored in the multidimensional user information table and whose source IP address information, destination IP address information, and behavior characteristic information are consistent with those of the data packet; or determining whether user terminal address information in 5-tuple of the data packet is included in the user terminal address information that is stored in the multidimensional user information table and of existing connections of the user terminal, where if yes, a protocol type of the connection on which the data packet is transmitted is a protocol type corresponding to an existing connection that is stored in the multidimensional user information table and whose user terminal address information is consistent with that of the data packet; or determining whether behavior statistics of the data packet and behavior statistics of a historical data packet are included in the behavior characteristic information that is stored in the multidimensional user information table and of existing connections of the user terminal, where if yes, a protocol type of the connection on which the data packet is transmitted is a protocol type corresponding to an existing connection that is stored in the multidimensional user information table and whose behavior characteristic information is consistent with that of the data packet.

With reference to the first aspect or any possible implementation manner of the first to the fourth possible implementation manners of the first aspect, in a fifth possible implementation manner, after the performing, according to information that is identified by the acquired multidimensional user information and about all connections that are currently established by the user terminal, multidimensional user information based protocol type identification on the connection on which the data packet is transmitted, the method further includes: if the identification succeeds, updating identification result data in the multidimensional user information table and outputting an identification result, where the identification result data is the identified protocol type of the connection on which the data packet is transmitted.

With reference to the first aspect or any possible implementation manner of the first to the fifth possible implementation manners of the first aspect, in a sixth possible implementation manner, after the performing, according to an acquired protocol type that is identified by the multidimensional user information and of existing connections of the user terminal, multidimensional user information based protocol type identification on the connection on which the data packet is transmitted, the method further includes: if the identification succeeds, further determining whether the data packet is a packet that cannot be successfully identified by using a characteristic, and if yes, collecting user based behavior statistics, and updating the behavior characteristic information that is in the multidimensional user information table and of existing connections of the user terminal.

According to a second aspect, an embodiment of the present invention further provides a protocol type identification method, and the method includes:

acquiring a data packet transmitted on a connection that is established between a user terminal and a server;

performing, according to a packet characteristic of the data packet, data flow based protocol type identification on the connection on which the data packet is transmitted;

if the data flow based identification fails, querying whether multidimensional user information corresponding to the user terminal exists in a multidimensional user information table, where the multidimensional user information is used to indicate information about all connections that are currently established by the user terminal; and if the multidimensional user information corresponding to the user terminal is found, performing, according to information that is identified by the acquired multidimensional user information and about all connections that are currently established by the user terminal, multidimensional user information based protocol type identification on the connection on which the data packet is transmitted.

According to the second aspect, in a first possible implementation manner, the querying whether multidimensional user information corresponding to the user terminal exists in a multidimensional user information table includes: querying, according to user terminal address information in the data packet, whether the multidimensional user information corresponding to the user terminal address information exists in the multidimensional user information table.

According to the first possible implementation manner of the second aspect, in a second possible implementation manner, after the querying whether multidimensional user information corresponding to the user terminal exists in a multidimensional user information table, the method further includes: if the multidimensional user information corresponding to the user terminal does not exist in the multidimensional user information table, adding the multidimensional user information corresponding to the user terminal to the multidimensional user information table.

With reference to the second aspect, in a third possible implementation manner, the multidimensional user information corresponding to the user terminal includes at least one item of the following information: source IP address information and destination IP address information that are corresponding to current existing connections of the user terminal, user terminal address information of existing connections of the user terminal, address information of servers that were accessed by the user terminal, a protocol list of the user terminal, and behavior characteristic information of existing connections of the user terminal; the multidimensional user information table includes the multidimensional user information and a correspondence between the multidimensional user information and protocol types of existing connections of the user terminal.

With reference to the third possible implementation manner of the second aspect, in a fourth possible implementation manner, the performing, according to information that is identified by the acquired multidimensional user information and about all connections that are currently established by the user terminal, multidimensional user information based protocol type identification on the connection on which the data packet is transmitted includes: determining whether server address information in a 5-tuple of the data packet is included in the address information that is stored in the multidimensional user information table and of servers that were accessed by the user terminal, where if yes, a protocol type of the connection on which the data packet is transmitted is a protocol type corresponding to an existing connection that is stored in the multidimensional user information table and whose server address information is consistent with that of the data packet; or determining whether source IP address information and destination IP address information in a 5-tuple of the data packet are included in the source IP address information and the destination IP address information that are stored in the multidimensional user information table and corresponding to existing connections of the user terminal, and if yes, continuing to determine whether characteristic information of the data packet is included in the behavior characteristic information that is stored in the multidimensional user information table and of existing connections of the user terminal, where if yes, a protocol type of the connection on which the data packet is transmitted is a protocol type corresponding to an existing connection that is stored in the multidimensional user information table and whose source IP address information, destination IP address information, and behavior characteristic information are consistent with those of the data packet; or determining whether user terminal address information in 5-tuple of the data packet is included in the user terminal address information that is stored in the multidimensional user information table and of existing connections of the user terminal, where if yes, a protocol type of the connection on which the data packet is transmitted is a protocol type corresponding to an existing connection that is stored in the multidimensional user information table and whose user terminal address information is consistent with that of the data packet; or determining whether behavior statistics of the data packet and behavior statistics of a historical data packet are included in the behavior characteristic information that is stored in the multidimensional user information table and of existing connections of the user terminal, where if yes, a protocol type of the connection on which the data packet is transmitted is a protocol type corresponding to an existing connection that is stored in the multidimensional user information table and whose behavior characteristic information is consistent with that of the data packet.

With reference to the second aspect or any possible implementation manner of the first to the fourth possible implementation manners of the second aspect, in a fifth possible implementation manner, after the performing, according to information that is identified by the acquired multidimensional user information and about all connections that are currently established by the user terminal, multidimensional user information based protocol type identification on the connection on which the data packet is transmitted, the method further includes: if the identification succeeds, updating identification result data in the multidimensional user information table and outputting an identification result, where the identification result data is the identified protocol type of the connection on which the data packet is transmitted.

With reference to the second aspect or any possible implementation manner of the first to the fifth possible implementation manners of the second aspect, in a sixth possible implementation manner, after the performing data flow based protocol type identification on the connection on which the data packet is transmitted, the method further includes: if the data flow based identification succeeds, performing corresponding service processing on the data packet.

With reference to the second aspect or any possible implementation manner of the first to the sixth possible implementation manners of the second aspect, in a seventh possible implementation manner, after the performing multidimensional user information based protocol type identification on the connection on which the data packet is transmitted, the method further includes: if the identification succeeds, further determining whether the data packet is a packet that cannot be successfully identified by using a characteristic, and if yes, collecting user based behavior statistics, and updating the behavior characteristic information that is in a user connection data table and of existing connections of the user terminal.

According to a third aspect, an embodiment of the present invention provides a protocol type identification apparatus, and the apparatus includes:

an acquiring unit, configured to acquire a data packet transmitted on a connection that is established between a user terminal and a server;

a querying unit, configured to query whether multidimensional user information corresponding to the user terminal exists in a multidimensional user information table, where the multidimensional user information is used to indicate information about all connections that are currently established by the user terminal;

a first processing unit, configured to: if the multidimensional user information corresponding to the user terminal is found, perform, according to information that is identified by the acquired multidimensional user information and about all connections that are currently established by the user terminal, multidimensional user information based protocol type identification on the connection on which the data packet is transmitted; and a second processing unit, configured to: if the multidimensional user information corresponding to the user terminal is not found, perform, according to a packet characteristic of the data packet, data flow based protocol type identification on the connection on which the data packet is transmitted.

In a first possible implementation manner, the querying unit is specifically configured to query, according to user terminal address information in the data packet, whether the multidimensional user information corresponding to the user terminal address information exists in the multidimensional user information table.

According to the first possible implementation manner of the third aspect, in a second possible implementation manner, the second processing unit is further configured to: if the multidimensional user information corresponding to the user terminal does not exist in the multidimensional user information table, the multidimensional user information corresponding to the user terminal is added to the multidimensional user information table.

With reference to the third aspect, or the first and the second possible implementation manners of the third aspect, in a third possible implementation manner, the multidimensional user information corresponding to the user terminal includes at least one item of the following information: source IP address information and destination IP address information that are corresponding to current existing connections of the user terminal, user terminal address information of existing connections of the user terminal, address information of servers that were accessed by the user terminal, a protocol list of the user terminal, and behavior characteristic information of existing connections of the user terminal; the multidimensional user information table includes the multidimensional user information and a correspondence between the multidimensional user information and protocol types of existing connections of the user terminal.

With reference to the third possible implementation manner of the third aspect, in a fourth possible implementation manner, the first processing unit is specifically configured to: determine whether server address information in a 5-tuple of the data packet is included in the address information that is stored in the multidimensional user information table and of servers that were accessed by the user terminal, where if yes, a protocol type of the connection on which the data packet is transmitted is a protocol type corresponding to an existing connection that is stored in the multidimensional user information table and whose server address information is consistent with that of the data packet; or determine whether source IP address information and destination IP address information in a 5-tuple of the data packet are included in the source IP address information and the destination IP address information that are stored in the multidimensional user information table and corresponding to existing connections of the user terminal, and if yes, continue to determine whether characteristic information of the data packet is included in the behavior characteristic information that is stored in the multidimensional user information table and of existing connections of the user terminal, where if yes, a protocol type of the connection on which the data packet is transmitted is a protocol type corresponding to an existing connection that is stored in the multidimensional user information table and whose source IP address information, destination IP address information, and behavior characteristic information are consistent with those of the data packet; or determine whether user terminal address information in 5-tuple of the data packet is included in the user terminal address information that is stored in the multidimensional user information table and of existing connections of the user terminal, where if yes, a protocol type of the connection on which the data packet is transmitted is a protocol type corresponding to an existing connection that is stored in the multidimensional user information table and whose user terminal address information is consistent with that of the data packet; or determine whether behavior statistics of the data packet and behavior statistics of a historical data packet are included in the behavior characteristic information that is stored in the multidimensional user information table and of existing connections of the user terminal, where if yes, a protocol type of the connection on which the data packet is transmitted is a protocol type corresponding to an existing connection that is stored in the multidimensional user information table and whose behavior characteristic information is consistent with that of the data packet.

With reference to the third aspect or any possible implementation manner of the first to the fourth possible implementation manners of the third aspect, in a fifth possible implementation manner, the first processing unit is further configured to: if the identification succeeds, update identification result data in the multidimensional user information table and output an identification result, where the identification result data is the identified protocol type of the connection on which the data packet is transmitted.

With reference to the third aspect or any possible implementation manner of the first to the fifth possible implementation manners of the third aspect, in a sixth possible implementation manner, the first processing unit is further configured to: if the identification succeeds, further determine whether the data packet is a packet that cannot be successfully identified by using a characteristic, and if yes, collect user based behavior statistics, and update the behavior characteristic information that is in the multidimensional user information table and of existing connections of the user terminal.

According to a fourth aspect, an embodiment of the present invention provides a protocol type identification apparatus, and the apparatus includes:
an acquiring unit, configured to acquire a data packet transmitted on a connection that is established between a user terminal and a server;

a first processing unit, configured to perform, according to a packet characteristic of the data packet, data flow based protocol type identification on the connection on which the data packet is transmitted;

a querying unit, configured to: if the data flow based identification fails, query whether multidimensional user information corresponding to the user terminal exists in a multidimensional user information table, where the multidimensional user information is used to indicate information about all connections that are currently established by the user terminal; and a second processing unit, configured to: if the multidimensional user information corresponding to the user terminal is found, perform, according to information that is identified by the acquired multidimensional user information and about all connections that are currently established by the user terminal, multidimensional user information based protocol type identification on the connection on which the data packet is transmitted.

According to the fourth aspect, in a first possible implementation manner, the querying unit is specifically configured to query, according to user terminal address information in the data packet, whether the multidimensional user information corresponding to the user terminal address information exists in the multidimensional user information table.

According to the first possible implementation manner of the fourth aspect, in a second possible implementation manner, the second processing unit is further configured to: if the multidimensional user information corresponding to the user terminal does not exist in the multidimensional user information table, add the multidimensional user information corresponding to the user terminal to the multidimensional user information table.

With reference to the fourth aspect, in a third possible implementation manner, the multidimensional user information corresponding to the user terminal includes at least one item of the following information: source IP address information and destination IP address information that are corresponding to current existing connections of the user terminal, user terminal address information of existing connections of the user terminal, address information of servers that were accessed by the user terminal, a protocol list of the user terminal, and behavior characteristic information of existing connections of the user terminal; the multidimensional user information table includes the multidimensional user information and a correspondence between the multidimensional user information and protocol types of existing connections of the user terminal.

With reference to the third possible implementation manner of the fourth aspect, in a fourth possible implementation manner, the second processing unit is specifically configured to: determine whether server address information in a 5-tuple of the data packet is included in the address information that is stored in the multidimensional user information table and of servers that were accessed by the user terminal, where if yes, a protocol type of the connection on which the data packet is transmitted is a protocol type corresponding to an existing connection that is stored in the multidimensional user information table and whose server address information is consistent with that of the data packet; or determine whether source IP address information and destination IP address information in a 5-tuple of the data packet are included in the source IP address information and the destination IP address information that are stored in the multidimensional user information table and corresponding to existing connections of the user terminal, and if yes, continue to determine whether characteristic information of the data packet is included in the behavior characteristic information that is stored in the multidimensional user information table and of existing connections of the user terminal, where if yes, a protocol type of the connection on which the data packet is transmitted is a protocol type corresponding to an existing connection that is stored in the multidimensional user information table and whose source IP address information, destination IP address information, and behavior characteristic information are consistent with those of the data packet; or determine whether user terminal address information in 5-tuple of the data packet is included in the user terminal address information that is stored in the multidimensional user information table and of existing connections of the user terminal, where if yes, a protocol type of the connection on which the data packet is transmitted is a protocol type corresponding to an existing connection that is stored in the multidimensional user information table and whose user terminal address information is consistent with that of the data packet; or determine whether behavior statistics of the data packet and behavior statistics of a historical data packet are included in the behavior characteristic information that is stored in the multidimensional user information table and of existing connections of the user terminal, where if yes, a protocol type of the connection on which the data packet is transmitted is a protocol type corresponding to an existing connection that is stored in the multidimensional user information table and whose behavior characteristic information is consistent with that of the data packet.

With reference to the fourth aspect or any possible implementation manner of the first to the fourth possible implementation manners of the fourth aspect, in a fifth possible implementation manner, the second processing unit is further configured to: if the multidimensional user information based identification succeeds, update identification result data in the multidimensional user information table and output an identification result.

With reference to the fourth aspect or any possible implementation manner of the first to the fifth possible implementation manners of the fourth aspect, in a sixth possible implementation manner, the first processing unit is further configured to: if the data flow based identification succeeds, perform corresponding service processing on the data packet.

With reference to the fourth aspect or any possible implementation manner of the first to the seventh possible implementation manners of the fourth aspect, in an eighth possible implementation manner, the second processing unit is further configured to: if the identification based on multidimensional user information succeeds, further determine whether the data packet is a packet that cannot be identified by using a characteristic, and if yes, collect user based behavior statistics, and update the behavior characteristic information that is in a user connection data table and of existing connections of the user terminal.

In the protocol type identification method and apparatus according to the embodiments of the present invention, multidimensional user information based protocol type identification is performed on a received data packet according to a protocol type of an existing connection of a user terminal, so that service control on a per user basis can be implemented, and the multidimensional user information based protocol type identification is combined with data flow based protocol type identification, so that identification accuracy of a DPI system can be increased and protocol identification performance can be improved.

DETAILED DESCRIPTION

The following gives a more detailed description of the technical solutions in the embodiments of the present invention by using the accompanying drawings and embodiments.

In practical application, as a new protocol identification method, a protocol type identification method provided in the embodiments of the present invention may be applied to service scenarios such as network optimization and application traffic control. When receiving a data packet of a newly-established connection, a network device such as an application service gateway or a router may analyze a protocol type of the data packet based on a multidimensional user information table, and therefore, in the embodiments of the present invention, service control on a per user basis may be implemented, and a protocol type identification method based on multidimensional user information is combined with a data flow based protocol type identification method, so that identification accuracy of a DPI system can be increased and protocol identification performance can be improved.

Mentioned in this application document, server address information, in a 5-tuple may be source address information or destination address information in a 5-tuple of a data packet, destination address information in a 5-tuple of a data packet sent by a user terminal to a server is a server address information in the 5-tuple, and source address information in a 5-tuple of a data packet sent by the server to the user terminal is a server address information in the 5-tuple. In addition, the user terminal may be specifically a client, or an application program that runs on the user terminal.

Figure 1:
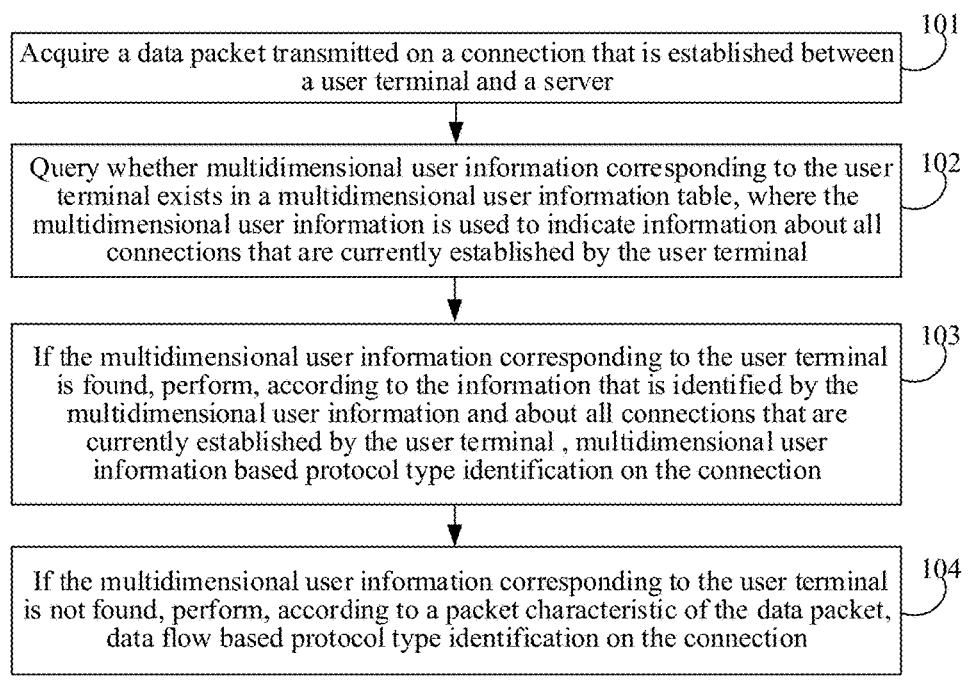
FIG. 1 is a flowchart of a protocol type identification method according to an embodiment of the present invention.

FIG. 1 is a flowchart of a protocol type identification method according to an embodiment of the present invention. This embodiment is executed by a network device, such as an application service gateway or a router, and a method for performing user based protocol type identification on a received data packet by the network device is described in detail in this embodiment. As shown in the figure, this embodiment includes the following steps:

Step 101: Acquire a data packet transmitted on a connection that is established between a user terminal and a server.

After receiving a data packet of a data flow, a network device parses the packet to obtain corresponding 5-tuple according to information in a packet header, where the 5-tuple includes a destination IP address, a destination port number, a source IP address, a source port number, and a transport layer protocol number (such as a Transmission Control Protocol (Transmission Control Protocol, TCP) number or a User Datagram Protocol (User Datagram Protocol, UDP) number) that are of the packet, and then determines, according to the 5-tuple, whether a connection corresponding to the data flow is a newly-established connection.

Preferably, after receiving the data packet, the network device may query a flow table to determine whether 5-tuple connection record information corresponding to the 5-tuple of the data packet exists in the flow table, where if connection record information corresponding to the quintuple information of the service data packet exists in the flow table, it is determined that the connection corresponding to the data flow is an existing connection, and if connection record information corresponding to the quintuple information of the service data packet does not exist in the flow table, it is determined that the connection corresponding to the data flow is a newly-established connection.

After the flow table is queried, if it is determined that the connection on which the data packet is transmitted is an existing connection, corresponding processing, for example, traffic control, may be directly performed on the data packet according to a protocol type identification result and a service processing method that are corresponding to the 5-tuple that is of the data packet and stored in the flow table. It should be noted that, although the connection on which the data packet is transmitted is an existing connection, step 102 may still proceed, that is, corresponding protocol identification is performed on the connection on which the data packet is transmitted.

Step 102: Query whether multidimensional user information corresponding to the user terminal exists in a multidimensional user information table, where the multidimensional user information is used to indicate information about all connections that are currently established by the user terminal.

The querying whether multidimensional user information corresponding to the user terminal exists in a multidimensional user information table includes: querying, according to user terminal address information in the data packet, whether the multidimensional user information corresponding to the user terminal address information exists in the multidimensional user information table.

The multidimensional user information includes one or a combination of any items of the following information: address pair information corresponding to existing connections of the user terminal, user terminal address information of existing connections of the user terminal, address information of servers that were accessed by the user terminal, protocol list of the user, and behavior characteristic information of existing connections of the user terminal, and the multidimensional user information table includes the multidimensional user information and a correspondence between the multidimensional user information and protocol types of existing connections of the user terminal.

Specifically, the multidimensional user information table may include a correspondence between the address information of servers that were accessed by the user terminal and the protocol types of existing connections of the user terminal, and/or a correspondence between source IP address information and destination IP address information that are of existing connections of the user terminal and the protocol types of existing connections of the user terminal, and/or a correspondence between the user terminal address information of existing connections of the user terminal and the protocol types of existing connections of the user terminal, and/or a correspondence between the behavior characteristic information of existing connections of the user terminal and the protocol types of existing connections of the user terminal.

Specifically, in this embodiment of the present invention, address pair information corresponding to an existing connection of the user terminal is an address pair consisting of a source IP address and a destination IP address of the existing connection, user terminal address information of an existing connection of the user terminal consists of an IP address and a port number that are of the user terminal corresponding to the existing connection, address information of a server that was accessed by the user terminal consists of an IP address and a port number that are of the server that was accessed by the user terminal, the protocol list of the user stores record information of protocols commonly used by the user, and the behavior characteristic information of existing connections of the user terminal includes protocol characteristics corresponding to the protocol types commonly used by the user, and behavior statistics of the user.

After the network device determines that the multidimensional user information of the user terminal corresponding to the connection on which the data packet is transmitted exists in the multidimensional user information table, step 103 may be performed.

After querying whether the multidimensional user information corresponding to the user terminal exists in the multidimensional user information table, if the multidimensional user information corresponding to the user terminal is not found in the multidimensional user information table, the network device adds the multidimensional user information corresponding to the user terminal to the multidimensional user information table. Preferably, after the protocol type identification on the connection on which the data packet is transmitted succeeds, the multidimensional user information of the user terminal may be added to the multidimensional user information table.

Step 103: If the multidimensional user information corresponding to the user terminal is found, perform, according to information that is identified by the acquired multidimensional user information and about all connections that are currently established by the user terminal, multidimensional user information based protocol type identification on the connection on which the data packet is transmitted.

For example, a packet is detected, and it is found that the packet is a message of the HTTP protocol, and in this case, it is considered that a connection/data flow to which the packet belongs is of the HTTP protocol, and all data packets in the connection/data flow are of the HTTP protocol. Therefore, in this embodiment of the present invention, the process of identifying a protocol type based on multidimensional user information is a process of identifying a protocol type of the received data packet based on related information of existing connections of the user terminal.

A protocol identification method that is performed based on multidimensional user information includes multiple independent identification methods, and no fixed order is required among the various identification methods. Each independent identification method is an identification method that is performed based on one dimension of information in the multidimensional user information, such as a protocol identification method that is performed based on server address information, a protocol identification method that is performed based on address pair information of existing connections of the user terminal, a protocol identification method that is performed based on user terminal address information of existing connections of the user terminal, a characteristic identification method based on existing connections of the user terminal, and a behavior identification method based on existing connections of the user terminal.

Specifically, the performing, according to information that is identified by the acquired multidimensional user information and about all connections that are currently established by the user terminal, multidimensional user information based protocol type identification on the connection on which the data packet is transmitted includes: determining whether server address information in a 5-tuple of the data packet is included in the address information that is stored in the multidimensional user information table and of servers that were accessed by the user terminal, where if yes, a protocol type of the connection on which the data packet is transmitted is a protocol type corresponding to an existing connection that is stored in the multidimensional user information table and whose server address information is consistent with that of the data packet; or determining whether source IP address information and destination IP address information in a 5-tuple of the data packet are included in the source IP address information and the destination IP address information that are stored in the multidimensional user information table and corresponding to existing connections of the user terminal, and if yes, continuing to determine whether characteristic information of the data packet is included in the behavior characteristic information that is stored in the multidimensional user information table and of existing connections of the user terminal, where if yes, a protocol type of the connection on which the data packet is transmitted is a protocol type corresponding to an existing connection that is stored in the multidimensional user information table and whose source IP address information, destination IP address information, and behavior characteristic information are consistent with those of the data packet; or determining whether user terminal address information in 5-tuple of the data packet is included in the user terminal address information that is stored in the multidimensional user information table and of existing connections of the user terminal, where if yes, a protocol type of the connection on which the data packet is transmitted is a protocol type corresponding to an existing connection that is stored in the multidimensional user information table and whose user terminal address information is consistent with that of the data packet; or determining whether behavior statistics of the data packet and behavior statistics of a historical data packet are included in the behavior characteristic information that is stored in the multidimensional user information table and of existing connections of the user terminal, where if yes, a protocol type of the connection on which the data packet is transmitted is a protocol type corresponding to an existing connection that is stored in the multidimensional user information table and whose behavior characteristic information is consistent with that of the data packet.

If the protocol type of the data flow is identified by the network device based on the multidimensional user information, the network device updates an identification result that is of the connection and in a multidimensional user information table.

Step 104: If the multidimensional user information corresponding to the user terminal is not found, perform, according to a packet characteristic of the data packet, data flow based protocol type identification on the connection on which the data packet is transmitted.

The data flow based protocol identification means that one or more data packets in a data flow are detected, so as to identify a protocol type used by the data flow/connection. If the protocol type of the data flow is not identified by the network device based on the multidimensional user information or if the multidimensional information of the user does not exist in the multidimensional user information table, the network device performs protocol identification based on the data flow. The flow based protocol identification method includes methods such as correlation identification, port identification, characteristic identification, and behavior identification. After the identification succeeds, an identification result that is of the connection and in a multidimensional user information table is also updated, and if the identification fails, an identification result of identification failure is output.

In conclusion, in the protocol type identification method according to this embodiment of the present invention, multidimensional user information based protocol type identification is performed on a received data packet according to a protocol type of an existing connection of a user terminal, so that service control on a per user basis can be implemented, and the multidimensional user information based protocol type identification is combined with data flow based protocol type identification, so that identification accuracy of a DPI system can be increased and protocol identification performance can be improved.

It should be noted that, to implement a protocol identification function in the network device, a DPI system may be configured in the device, and when the network device receives a data packet, the DPI system may perform corresponding packet protocol identification.

Figure 3:
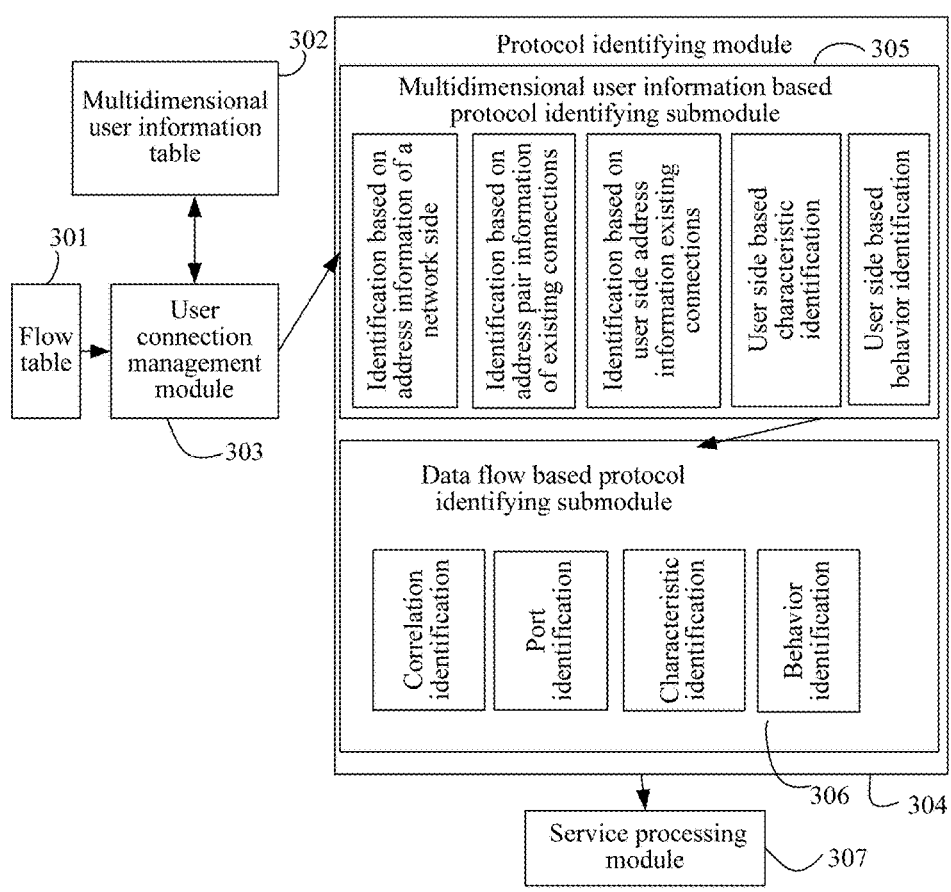
FIG. 3 is a block diagram of a DPI system according to an embodiment of the present invention.

Specifically, content included in the DPI system is shown in FIG. 3, and FIG. 3 is a block diagram of the DPI system according to an embodiment of the present invention. As shown in the figure, the DPI system includes a flow table 301, a user connection management module 303, a multidimensional user information table 302, a protocol identifying module 304, and a service processing module 307. The protocol identifying module includes a multidimensional user information based protocol identifying submodule 305 and a data flow based protocol identifying submodule 306. The multidimensional user information based protocol identifying submodule may identify a protocol type of a packet by using multiple independent identification methods, such as an identification method based on server address information, identification based on address pair information of existing connections, identification based on user terminal address information of existing connections, user terminal based characteristic identification, and user terminal based behavior identification, and these independent identification methods may also be combined for use; the data flow based protocol identifying submodule may also identify the protocol type of the packet by using multiple independent identification methods, such as correlation identification, port identification, characteristic identification, and behavior identification. When the DPI system runs, a flow table is first queried to determine whether the connection is a newly-established connection, and then the processing proceeds with the user connection management module, and the module queries whether a user record to which the newly-established connection belongs exists in the multidimensional user information table, and if a user record to which the newly-established connection belongs exits, protocol identification is performed based on multidimensional user information in the multidimensional user information table; if the multidimensional user information based protocol identification succeeds, the multidimensional user information table is updated and then an identification result is output, and the processing proceeds with the service processing module, and otherwise, proceeds with the flow based protocol identifying module and the identification continues; and if the flow based protocol identification succeeds, the multidimensional user information table is updated and then an identification result is output, and the processing proceeds with service processing.

The foregoing embodiment briefly describes a process in which a DPI system performs protocol identification, and the following uses a detailed embodiment to describe a protocol identification process.

Figure 2:
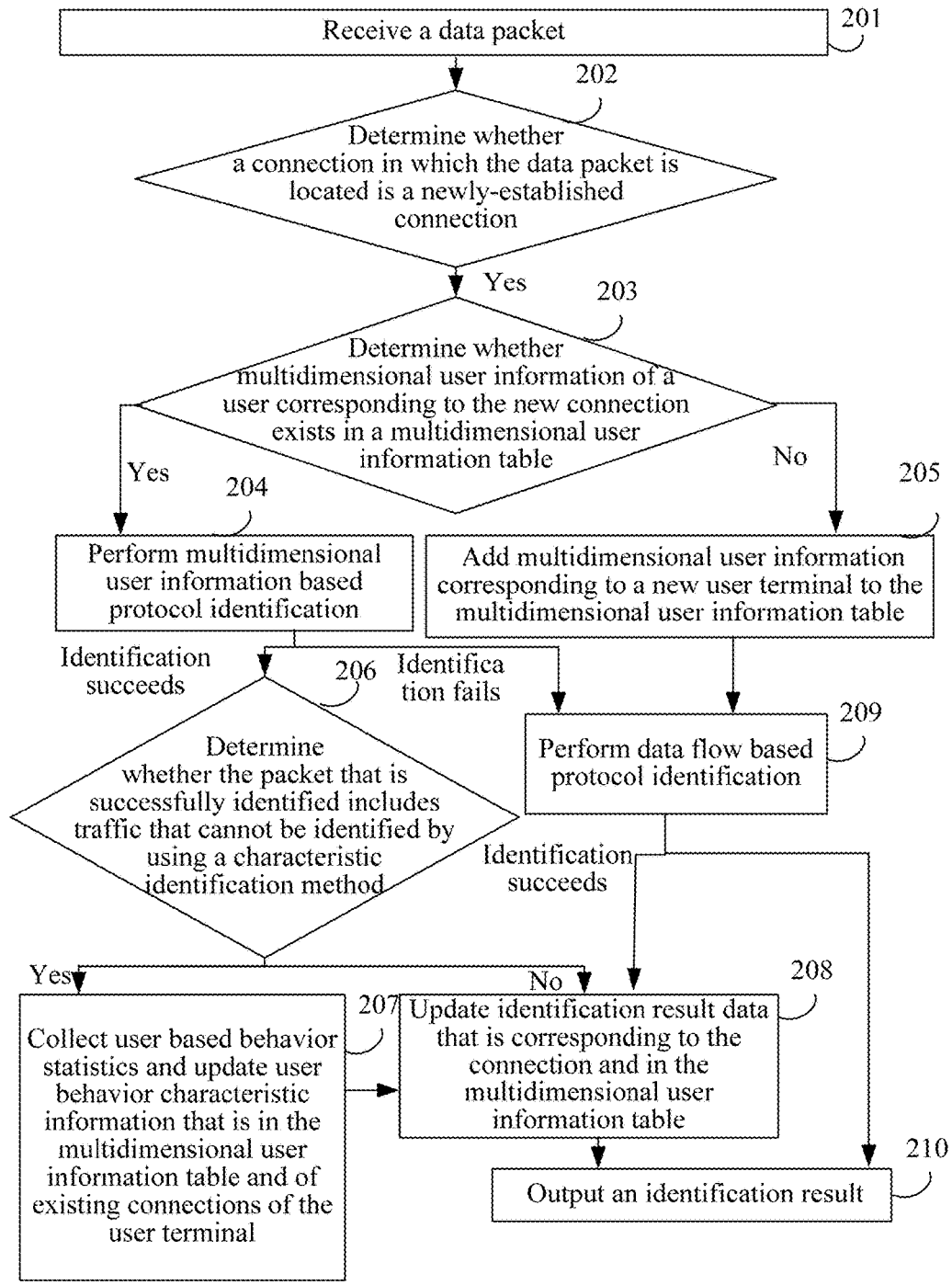
FIG. 2 is a flowchart of another protocol type identification method according to an embodiment of the present invention.

FIG. 2 is a flowchart of another protocol type identification method according to an embodiment of the present invention. This embodiment is executed by a network device, such as an application service gateway or a router, and a process in which the network device performs protocol identification on a received packet is described in detail. As shown in the figure, this embodiment includes the following steps:

Step 201: Receive a data packet.

Step 202: Determine whether a connection on which the data packet is transmitted is a newly-established connection.

The network device parses the received data packet to obtain corresponding 5-tuple according to information in a packet header, where the 5-tuple includes a destination IP address, a destination port number, a source IP address, a source port number, and a transport layer protocol number that are of the packet.

Specifically, whether connection record information corresponding to the 5-tuple exists in a flow table may be queried. The flow table stores record information of connections that were detected by a DPI system, and the flow table may include 5-tuple, identification results of corresponding connections, corresponding service control policies, and the like.

If the flow table stores the 5-tuple corresponding to the received data packet, it indicates that the connection corresponding to the data packet is an existing connection, and otherwise, it indicates that the corresponding connection is a newly-established connection. If it is determined that the corresponding connection is a newly-established connection, step 203 is performed.

Step 203: Determine whether multidimensional user information corresponding to the newly-established connection exists in a multidimensional user information table.

Specifically, the multidimensional user information table may be queried to determine whether multidimensional user information corresponding to user terminal address information in the 5-tuple exists in the multidimensional user information table, where if connection record information corresponding to the quintuple information of the service data packet exists in the flow table, it is determined that multidimensional user information of a user terminal corresponding to the newly-established connection exists in the multidimensional user information table, and if connection record information corresponding to the quintuple information of the service data packet does not exist in the flow table, it is determined that the multidimensional user information of the user terminal corresponding to the newly-established connection does not exist in the multidimensional user information table. The user terminal address information is IP address information of the user terminal device or IP address information and port information of the user terminal device.

The multidimensional user information includes one or a combination of any items of the following information: address pair information corresponding to existing connections of the user terminal, user terminal address information of existing connections of the user terminal, address information of servers that were accessed by the user terminal, protocol list of the user, and behavior characteristic information of existing connections of the user terminal. The multidimensional user information table not only includes the multidimensional user information, but also includes a correspondence between the multidimensional user information and protocol types of existing connections of the user terminal.

If the multidimensional user information of the user terminal corresponding to the newly-established connection exists in the multidimensional user information table, step 204 is performed, and otherwise, step 205 is performed.

Step 204: Perform multidimensional user information based protocol identification.

A protocol identification method that is performed based on multidimensional user information includes multiple independent identification methods, and no fixed order is required among the various identification methods. Each independent identification method is an identification method that is performed based on one dimension of information in the multidimensional user information, such as a protocol identification method that is performed based on server address information, a protocol identification method that is performed based on address pair information of existing connections of the user terminal, a protocol identification method that is performed based on user terminal address information of existing connections of the user terminal, a characteristic identification method based on existing connections of the user terminal, and a behavior identification method based on existing connections of the user terminal.

Specifically, the protocol identification method that is performed based on server address information is specifically as follows: If a user initiates a connection to a server port, then a protocol type of a connection that is subsequently initiated by the user to a same server port is definitely the same as a protocol type of the first connection. For example, the user accesses a server (for example, 1.2.3.4:80) by using the HTTP protocol, and then protocol types of all connections by using which the user subsequently accesses the server (1.2.3.4:80) are HTTP.

Specifically, the protocol identification method that is performed based on address pair information of existing connections of the user terminal is specifically as follows: If a user initiates a connection to a server, then a protocol type of a connection that is subsequently initiated by the user to a same server IP address may be the same as a protocol type of the first connection. In the identification method, a connection that has a same IP address pair (a destination IP address and a source IP address) as the newly-established connection is found from historical connections of the user, and then simple determining (for example, simple feature character confirmation) is used to confirm whether a protocol type of the newly-established connection is the same as a protocol type of the historical connection.

Specifically, the protocol identification method based on user terminal address information of existing connections of the user terminal is specifically as follows: If a user initiates multiple connections to one or more destination addresses by using a same (IP:Port), then protocol types of these connections that have the same user terminal (IP:Port) are the same. In the identification method, a connection that has a same user terminal address (IP:Port) as the newly-established connection is found from historical connections of the user, and it may be determined that a protocol type of the newly-established connection is the same as a protocol type of the historical connection.

Specifically, the user based characteristic identification method is specifically as follows: A list of commonly-used protocols is recorded on a per user basis, and sources of the protocol list include protocols previously used by the user and a pre-configured protocol list (for example, a popular protocol application of an area in which the user is located). In a process of identification by using the user based characteristic identification method, a protocol in a commonly used protocol list of the user is identified by using a protocol characteristic scanning method.

Specifically, the user based behavior identification method is specifically as follows: User behavior statistics of packets of a user are compared with a user behavior characteristic set, where if the user behavior statistics match the user behavior characteristic set, a protocol to which a current packet belongs may be determined. The user behavior statistics include dimensions such as a statistical distribution of binary values in packets, a port range, packet length statistics (a packet length range, a packet length sequence, a packet length set, a packet length average value, a sum of lengths of packets interacted between uplink and downlink each time), a packet sending frequency, a received packets to transmitted packets ratio, and a disperse degree of destination addresses. The user behavior characteristic set is stored in a user record, and initial content of the user behavior characteristic set is user behavior characteristics that are configured in advance and are enriched and updated according to behavior statistics of historical connections of the user in identification processes.

If the identification succeeds, step 206 is performed, and otherwise, step 209 is performed.

Step 205: Add multidimensional user information corresponding to a new user terminal to the multidimensional user information table.

If the multidimensional user information corresponding to the new user terminal does not exist in the multidimensional user information table, a corresponding record is added to the multidimensional user information table. After the record is added, step 209 is performed, that is, protocol identification is performed on the data packet based on the data flow.

Step 206: If the identification succeeds, determine whether the packet whose protocol is successfully identified includes traffic that cannot be identified by using the characteristic identification method.

If a protocol type of the packet is successfully identified based on the multidimensional user information, then it is further determined whether the packet that is successfully identified includes the traffic that cannot be identified by using the characteristic identification method. For example, if a first connection that is established by a user is an encrypted connection, the connection cannot be identified by using the characteristic identification method, but is identified by using the "behavior identification" method in the "data flow based protocol identification", and then DPI may record information such as an IP address and a port of the encrypted connection; and when the user establishes a second same encrypted connection, DPI may identify the second encrypted connection by using one of the five methods in the invention, in this case, the determining is triggered and DPI may update behavior characteristics of a corresponding protocol by using behavior statistics of the second encrypted connection.

If yes, step 207 is performed, and otherwise, step 208 is performed.

Step 207: Collect user based behavior statistics and update user behavior characteristic information that is in the multidimensional user information table and of existing connections of the user terminal.

Because a connection needs to be identified by using behavior characteristics, if the connection cannot be identified by using behavior characteristics, then this connection may be used as sample data of behavior characteristics of a corresponding protocol to help improve and perfect behavior characteristics of the corresponding protocol.

Step 208: Update identification result data that is corresponding to the connection and in the multidimensional user information table.

Regardless whether the flow based protocol identification method or the user based protocol identification method is used, if the protocol type corresponding to the connection is successfully identified, the corresponding identification result data in the multidimensional user information table needs to be updated. Optionally, a protocol identification result, a service control policy, and the like that are corresponding to the data flow may also be updated in the flow table.

Step 209: If the identification fails, perform data flow based protocol identification.

If the user based protocol identification fails, the identification is performed based on the data flow, and a flow based protocol identification method includes correlation identification, port identification, characteristic identification, behavior identification, and the like. If the flow based identification succeeds, step 208 is performed, and otherwise, step 210 is performed.

Step 210: Output an identification result.

Regardless whether the identification succeeds, the identification result may be output, so that corresponding service control is performed according to the identification result.

In conclusion, in the protocol type identification method according to this embodiment of the present invention, multidimensional user information based protocol type identification is performed on a received data packet according to a protocol type of an existing connection of a user terminal, so that service control on a per user basis can be implemented, and the multidimensional user information based protocol type identification is combined with data flow based protocol type identification, so that identification accuracy of a DPI system can be increased and protocol identification performance can be improved.

Figure 4:
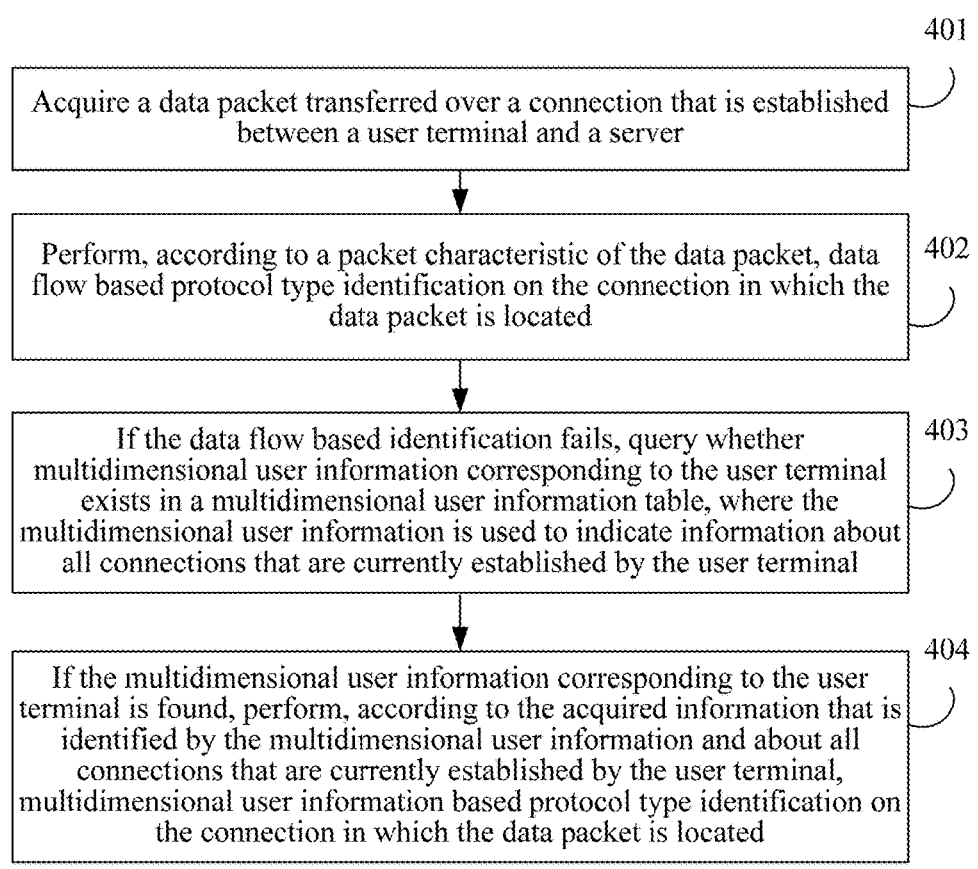
FIG. 4 is a flowchart of another protocol type identification method according to an embodiment of the present invention.

An embodiment of the present invention further provides a protocol type identification method, and FIG. 4 is a flowchart of another protocol type identification method according to this embodiment of the present invention. This embodiment is executed by a network device, such as an application service gateway or a router, and a method for performing protocol type identification based on a user on a received data packet by the network device is described in detail in this embodiment. As shown in the figure, this embodiment includes the following steps:

Step 401: Acquire a data packet transmitted on a connection that is established between a user terminal and a server.

After receiving a data packet of a data flow, the network device parses the packet to obtain corresponding 5-tuple according to information in a packet header, where the 5-tuple includes a destination IP address, a destination port number, a source IP address, a source port number, and a Transport layer protocol that are of the packet, and then it is determined, according to the 5-tuple, whether a connection corresponding to the data flow is a newly-established connection.

Preferably, after receiving the data packet, the network device may query a flow table to determine whether 5-tuple connection record information corresponding to the 5-tuple of the data packet exists in the flow table, where if connection record information corresponding to the quintuple information of the service data packet exists in the flow table, it is determined that the connection corresponding to the data flow is an existing connection, and if connection record information corresponding to the quintuple information of the service data packet does not exist in the flow table, it is determined that the connection corresponding to the data flow is a newly-established connection.

After the flow table is queried, if it is determined that the connection, on which the data packet is transmitted, corresponding to the data flow is an existing connection, corresponding processing, for example, traffic control, is directly performed on the data packet according to a protocol type identification result and a service processing method that are corresponding to the 5-tuple that is of the data packet and stored in the flow table. It should be noted that, although the connection on which the data packet is transmitted is an existing connection, step 402 may also continue to be performed, that is, corresponding protocol identification is performed on the connection on which the data packet is transmitted.

Step 402: Perform, according to a packet characteristic of the data packet, data flow based protocol type identification on the connection on which the data packet is transmitted.

A data flow based protocol identification method includes methods such as correlation identification, port identification, characteristic identification, and behavior identification. After the identification succeeds, an identification result that is of the connection and in a multidimensional user information table is also updated, and if the identification fails, an identification result of identification failure is output.

Step 403: If the data flow based identification fails, query whether multidimensional user information corresponding to the user terminal exists in a multidimensional user information table, where the multidimensional user information is used to indicate information about all connections that are currently established by the user terminal.

The querying whether multidimensional user information corresponding to the user terminal exists in a multidimensional user information table includes: querying, according to user terminal address information in the data packet, whether the multidimensional user information corresponding to the user terminal address information exists in the multidimensional user information table.

The multidimensional user information includes one or a combination of any items of the following information: address pair information corresponding to existing connections of the user terminal, user terminal address information of existing connections of the user terminal, address information of servers that were accessed by the user terminal, protocol list of the user, and behavior characteristic information of existing connections of the user terminal; the multidimensional user information table includes the multidimensional user information and a correspondence between the multidimensional user information and protocol types of existing connections of the user terminal.

Specifically, in this embodiment of the present invention, address pair information corresponding to an existing connection of the user terminal is an address pair consisting of a source IP address and a destination IP address of the existing connection, user terminal address information of an existing connection of the user terminal consists of an IP address and a port number that are of the user terminal corresponding to the existing connection, address information of a server that was accessed by the user terminal consists of an IP address and a port number that are of the server that was accessed by the user terminal, the protocol list of the user stores record information of protocols commonly used by the user, and the behavior characteristic information of existing connections of the user terminal includes protocol characteristics corresponding to the protocol types commonly used by the user, and behavior statistics of the user.

After the network device determines that the multidimensional user information of the user terminal corresponding to the connection on which the data packet is transmitted exists in the multidimensional user information table, step 404 may be performed.

After querying whether the multidimensional user information corresponding to the user terminal exists in the multidimensional user information table, if the multidimensional user information corresponding to the user terminal is not found in the multidimensional user information table, the network device adds the multidimensional user information corresponding to the user terminal to the multidimensional user information table. Preferably, after the protocol type identification on the connection on which the data packet is transmitted succeeds, the multidimensional user information of the user terminal may be added to the multidimensional user information table.

Step 404: If the multidimensional user information corresponding to the user terminal is found, perform, according to information that is identified by the acquired multidimensional user information and about all connections that are currently established by the user terminal, multidimensional user information based protocol type identification on the connection on which the data packet is transmitted.

A protocol identification method that is performed based on multidimensional user information includes multiple independent identification methods, and no fixed order is required among the various identification methods. Each independent identification method is an identification method that is performed based on one dimension of information in the multidimensional user information, such as a protocol identification method that is performed based on server address information, a protocol identification method that is performed based on address pair information of existing connections of the user terminal, a protocol identification method that is performed based on user terminal address information of existing connections of the user terminal, a characteristic identification method based on existing connections of the user terminal, and a behavior identification method based on existing connections of the user terminal.

Specifically, the performing, according to information that is identified by the acquired multidimensional user information and about all connections that are currently established by the user terminal, multidimensional user information based protocol type identification on the connection on which the data packet is transmitted includes: determining whether server address information in a 5-tuple of the data packet is included in the address information that is stored in the multidimensional user information table and of servers that were accessed by the user terminal, where if yes, a protocol type of the connection on which the data packet is transmitted is a protocol type corresponding to an existing connection that is stored in the multidimensional user information table and whose server address information is consistent with that of the data packet; or determining whether source IP address information and destination IP address information in a 5-tuple of the data packet are included in the source IP address information and the destination IP address information that are stored in the multidimensional user information table and corresponding to existing connections of the user terminal, and if yes, continuing to determine whether characteristic information of the data packet is included in the behavior characteristic information that is stored in the multidimensional user information table and of existing connections of the user terminal, where if yes, a protocol type of the connection on which the data packet is transmitted is a protocol type corresponding to an existing connection that is stored in the multidimensional user information table and whose source IP address information, destination IP address information, and behavior characteristic information are consistent with those of the data packet; or determining whether user terminal address information in 5-tuple of the data packet is included in the user terminal address information that is stored in the multidimensional user information table and of existing connections of the user terminal, where if yes, a protocol type of the connection on which the data packet is transmitted is a protocol type corresponding to an existing connection that is stored in the multidimensional user information table and whose user terminal address information is consistent with that of the data packet; or determining whether behavior statistics of the data packet and behavior statistics of a historical data packet are included in the behavior characteristic information that is stored in the multidimensional user information table and of existing connections of the user terminal, where if yes, a protocol type of the connection on which the data packet is transmitted is a protocol type corresponding to an existing connection that is stored in the multidimensional user information table and whose behavior characteristic information is consistent with that of the data packet.

If the protocol type of the data flow is identified by the network device based on the multidimensional user information, the network device updates an identification result that is of the connection and in a multidimensional user information table.

In conclusion, in this embodiment of the present invention, multidimensional user information based protocol identification is implemented, so that service control on a per user basis can be implemented, and in addition, identification accuracy of a DPI system can be increased and protocol identification performance can be improved.

The foregoing embodiment corresponding to FIG. 4 briefly describes a process in which a DPI system performs protocol identification, and the following uses a detailed embodiment to describe a protocol identification process.

Figure 5:
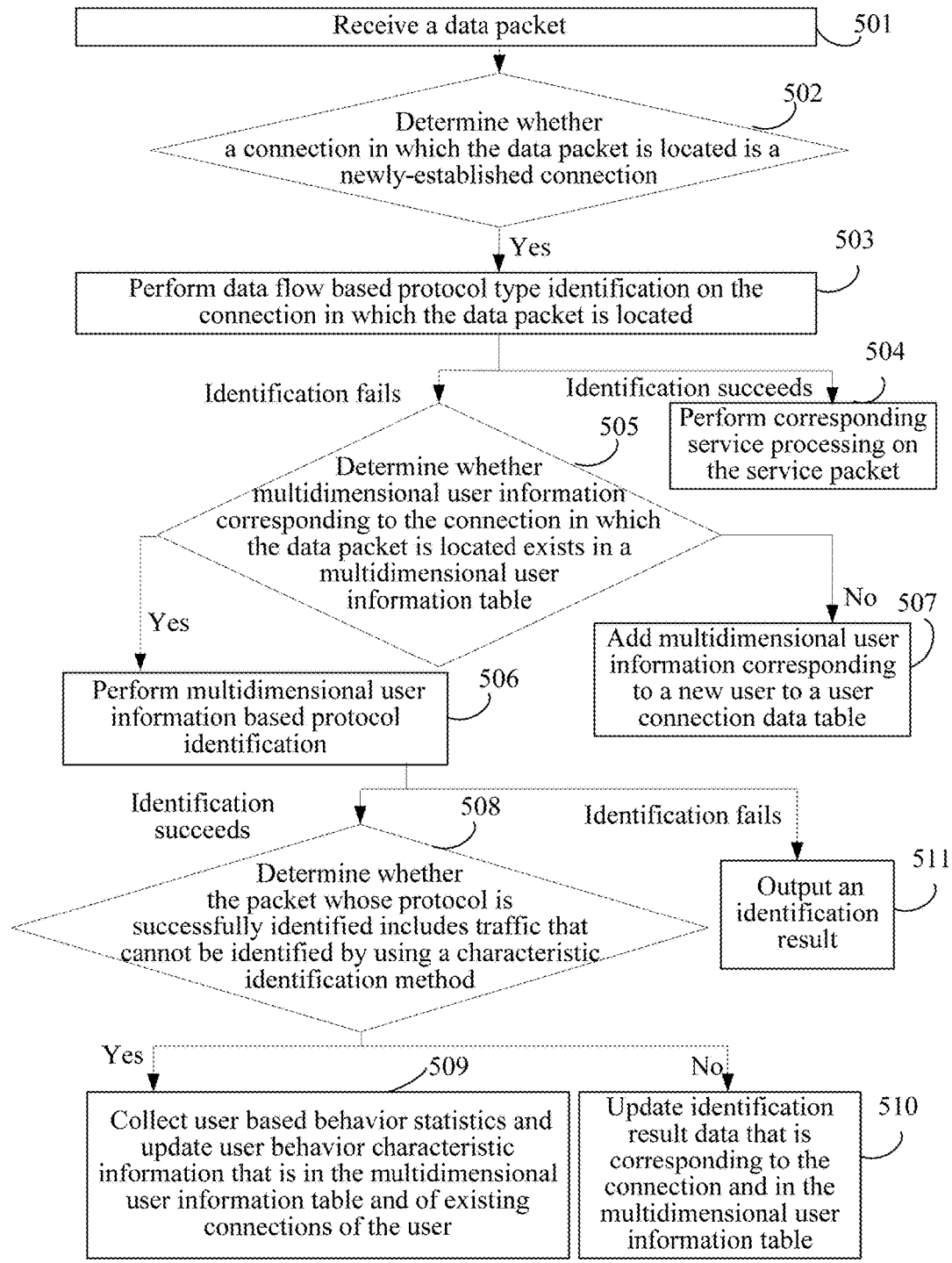
FIG. 5 is a flowchart of another protocol type identification method according to an embodiment of the present invention.

FIG. 5 is a flowchart of another protocol type identification method according to an embodiment of the present invention. This embodiment is executed by a network device, such as an application service gateway or a router, and a process in which the network device performs protocol identification on a received packet is described in detail. As shown in the figure, this embodiment includes the following steps:

Step 501: Receive a data packet.

Step 502: Determine whether a connection on which the data packet is transmitted is a newly-established connection.

The network device parses the received data packet to obtain corresponding 5-tuple according to information in a packet header, where the 5-tuple includes a destination IP address, a destination port number, a source IP address, a source port number, and a TCP protocol number that are of the packet.

Specifically, whether 5-tuple connection record information corresponding to the 5-tuple exists in a flow table may be queried. The flow table stores record information of connections corresponding to data flows that were detected by a DPI system, and the flow table may include 5-tuple, identification results of corresponding connections, corresponding service control policies, 5-tuple and the like.

If the flow table stores the 5-tuple corresponding to the received data packet, it indicates that the connection corresponding to the data packet is an existing connection, and otherwise, it indicates that the corresponding connection is a newly-established connection. If it is determined that the corresponding connection is a newly-established connection, step 503 is performed.

Step 503: Perform data flow based protocol type identification on the connection on which the data packet is transmitted.

A data flow based protocol identification method includes methods such as correlation identification, port identification, characteristic identification, and behavior identification. After the identification succeeds, an identification result that is of the connection and in a multidimensional user information table is also updated, and if the identification fails, an identification result of identification failure is output.

Step 504: If the data flow based identification succeeds, perform corresponding service processing on the service packet.

Step 505: If the data flow based identification fails, determine whether multidimensional user information corresponding to the connection on which the data packet is transmitted exists in a multidimensional user information table.

The determining whether multidimensional user information corresponding to the connection on which the data packet is transmitted exists in a multidimensional user information table includes: determining, according to user terminal address information in the 5-tuple of the data packet, whether the multidimensional user information corresponding to the user terminal address information exists in the multidimensional user information table.

The multidimensional user information includes one or a combination of any items of the following information: address pair information corresponding to existing connections of the user terminal, user terminal address information of existing connections of the user terminal, address information of servers that were accessed by the user terminal, protocol list of the user, and behavior characteristic information of existing connections of the user terminal.

Specifically, in this embodiment of the present invention, address pair information corresponding to an existing connection of the user terminal is an address pair consisting of a source IP address and a destination IP address of the existing connection, user terminal address information of an existing connection of the user terminal consists of an IP address and a port number that are of the user terminal corresponding to the existing connection, address information of a server that was accessed by the user terminal consists of an IP address and a port number that are of the server that was accessed by the user terminal, the protocol list of the user stores record information of protocols commonly used by the user, and the behavior characteristic information of existing connections of the user terminal includes protocol characteristics corresponding to the protocol types commonly used by the user, and behavior statistics of the user.

After determining that the multidimensional user information of the user terminal corresponding to the connection on which the data packet is transmitted does not exist in the multidimensional user information table, the network device may add the multidimensional user information of the user terminal to the multidimensional user information table.

If the multidimensional user information of the user terminal corresponding to the newly-established connection exists in the multidimensional user information table, step 506 is performed, and otherwise, step 507 is performed.

Step 506: Perform multidimensional user information based protocol identification.

A protocol identification method that is performed based on multidimensional user information includes multiple independent identification methods, and no fixed order is required among the various identification methods. Each independent identification method is an identification method that is performed based on one dimension of information in the multidimensional user information, such as a protocol identification method that is performed based on server address information, a protocol identification method that is performed based on address pair information of existing connections of the user terminal, a protocol identification method that is performed based on user terminal address information of existing connections of the user terminal, a characteristic identification method based on existing connections of the user terminal, and a behavior identification method based on existing connections of the user terminal.

Specifically, the protocol identification method that is performed based on server address information is specifically as follows: If a user initiates a connection to a server port, then a protocol type of a connection that is subsequently initiated by the user to a same server port is definitely the same as a protocol type of the first connection. For example, the user accesses a server (for example, 1.2.3.4:80) by using the HTTP protocol, and then protocol types of all connections by using which the user subsequently accesses the server (1.2.3.4:80) are HTTP.

Specifically, the protocol identification method that is performed based on address pair information of existing connections of the user terminal is specifically as follows: If a user initiates a connection to a server, then a protocol type of a connection that is subsequently initiated by the user to a same server IP address may be the same as a protocol type of the first connection. In the identification method, a connection that has a same IP address pair (a destination IP address and a source IP address) as the newly-established connection is found from historical connections of the user, and then simple determining (for example, simple feature character confirmation) is used to confirm whether a protocol type of the newly-established connection is the same as a protocol type of the historical connection.

Specifically, the protocol identification method based on user terminal address information of existing connections of the user terminal is specifically as follows: If a user initiates multiple connections to one or more destination addresses by using a same (IP:Port), then protocol types of these connections that have the same user terminal (IP:Port) are the same. In the identification method, a connection that has a same user terminal address (IP:Port) as the newly-established connection is found from historical connections of the user, and it may be confirmed that a protocol type of the newly-established connection is the same as a protocol type of the historical connection.

Specifically, the user based characteristic identification method is specifically as follows: A list of commonly-used protocols is recorded on a per user basis, and sources of the protocol list include protocols previously used by the user and a pre-configured protocol list (for example, a popular protocol application of an area in which the user is located). In a process of identification by using the user based characteristic identification method, a protocol in a commonly used protocol list of the user is identified by using a protocol characteristic scanning method.

Specifically, the user based behavior identification method is specifically as follows: User behavior statistics of packets of a user are compared with a user behavior characteristic set, where if the user behavior statistics match the user behavior characteristic set, a protocol to which a current packet belongs may be determined. The user behavior statistics include dimensions such as a statistical distribution of binary values in packets, a port range, packet length statistics (a packet length range, a packet length sequence, a packet length set, a packet length average value, a sum of lengths of a packet interacted between uplink and downlink each time), a packet sending frequency, a received packets to transmitted packets ratio, and a disperse degree of destination addresses. The user behavior characteristic set is stored in a user record, and initial content of the user behavior characteristic set is user behavior characteristics that are configured in advance and are enriched and updated according to behavior statistics of historical connections of the user in identification processes.

If the identification succeeds, step 508 is performed, and otherwise, step 511 is performed and an identification result is output.

Step 507: Add multidimensional user information corresponding to a new user terminal to the multidimensional user information table.

If the multidimensional user information corresponding to the new user terminal does not exist in a user connection data table, a corresponding record is added to the user connection data table. After the record is added, step 509 is performed, that is, protocol identification is performed on the data packet based on the data flow.

Step 508: If the identification succeeds, determine whether the packet whose protocol is successfully identified includes traffic that cannot be identified by using a characteristic identification method.

If a protocol type of the packet is successfully identified based on the multidimensional user information, then it is further determined whether the packet that is successfully identified includes the traffic that cannot be identified by using the characteristic identification method. For example, if a first connection that is established by a user is an encrypted connection, the traffic cannot be identified by using the characteristic identification method, but is identified by using the "behavior identification" method in the "flow based protocol identification", and then DPI may record information such as an IP address and a port of the encrypted connection; and when the user establishes a second same encrypted connection, DPI may identify the second encrypted connection by using one of the five methods in the invention, in this case, the determining is triggered and DPI may update behavior characteristics of a corresponding protocol by using behavior statistics of the second encrypted connection.

If yes, step 509 is performed, and otherwise, step 510 is performed.

Step 509: Collect user based behavior statistics and update user behavior characteristic information that is in the multidimensional user information table and of existing connections of the user terminal.

Because a connection needs to be identified by using behavior characteristics, if the connection cannot be identified by using behavior characteristics, then this connection may be used as sample data of behavior characteristics of a corresponding protocol to help improve and perfect behavior characteristics of the corresponding protocol.

Step 510: Update identification result data that is corresponding to the connection and in the multidimensional user information table.

Regardless whether the flow based protocol identification method or the user based protocol identification method is used, if the protocol type corresponding to the connection is successfully identified, the corresponding identification result data in the multidimensional user information table needs to be updated. Optionally, a protocol identification result, a service control policy, and the like that are corresponding to the data flow may also be updated in the flow table.

Step 511: Output an identification result.

Regardless whether the identification succeeds, the identification result may be output, so that corresponding service control is performed according to the identification result.

In conclusion, in this embodiment of the present invention, user based protocol identification is implemented, and service control on a per user basis may also be implemented by using the user based protocol identification. Because multidimensional user information based protocol identification may be performed based on only an IP address and a port that are of a packet, and content of the packet is not deeply scanned, protocol identification performance may be greatly improved.

Figure 6:
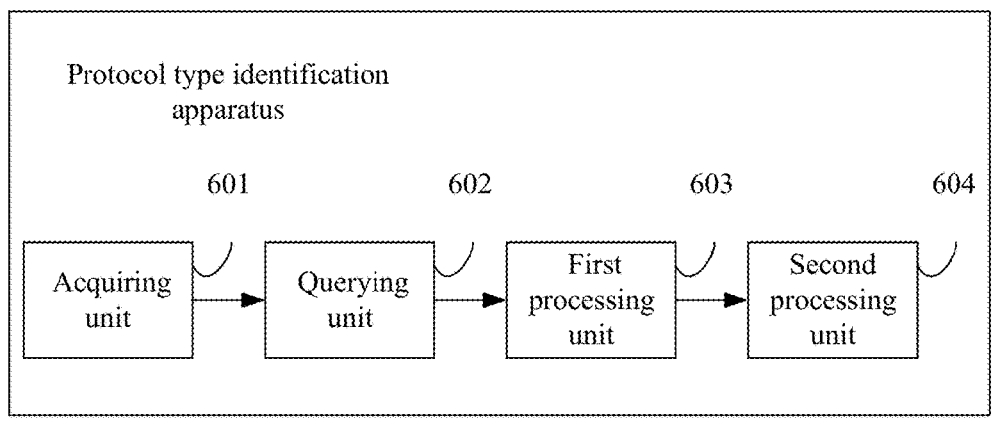
FIG. 6 is a schematic diagram of a protocol type identification apparatus according to an embodiment of the present invention.

Accordingly, an embodiment of the present invention further provides a protocol type identification apparatus, and FIG. 6 is a schematic diagram of the protocol type identification apparatus according to this embodiment of the present invention. As shown in the figure, this embodiment includes the following functional units: an acquiring unit 601, a querying unit 602, a first processing unit 603, and a second processing unit 604.

The acquiring unit 601 is configured to acquire a data packet transmitted on a connection that is established between a user terminal and a server.

After receiving a data packet of a data flow, a network device parses the packet to obtain corresponding 5-tuple according to information in a packet header, where the 5-tuple includes a destination IP address, a destination port number, a source IP address, a source port number, and a TCP protocol number that are of the packet.

Preferably, after the network device receives the data packet, the network device may query a flow table to determine whether 5-tuple connection record information corresponding to the 5-tuple of the data packet exists in the flow table, where if connection record information corresponding to the quintuple information of the service data packet exists in the flow table, it is determined that a connection corresponding to the data flow is an existing connection, and if connection record information corresponding to the quintuple information of the service data packet does not exist in the flow table, it is determined that the connection corresponding to the data flow is a newly-established connection.

After the flow table is queried, if it is determined that the connection, on which the data packet is transmitted, corresponding to the data flow is an existing connection, corresponding processing, for example, traffic control, is directly performed on the data packet according to protocol type identification result and a service processing method that are corresponding to the 5-tuple that is of the data packet and stored in the flow table. It should be noted that, although the connection on which the data packet is transmitted is an existing connection, the querying unit 602 may also continue to perform the following determining operation, that is, corresponding protocol identification is performed on the connection on which the data packet is transmitted.

The querying unit 602 is configured to query whether multidimensional user information corresponding to the user terminal exists in a multidimensional user information table, where the multidimensional user information is used to indicate information about all connections that are currently established by the user terminal.

The querying unit 602 is specifically configured to query, according to user terminal address information in the data packet, whether the multidimensional user information corresponding to the user terminal address information exists in the multidimensional user information table.

The multidimensional user information corresponding to the user terminal includes at least one item of the following information: source IP address information and destination IP address information that are corresponding to current existing connections of the user terminal, user terminal address information of existing connections of the user terminal, address information of servers that were accessed by the user terminal, a protocol list of the user terminal, and behavior characteristic information of existing connections of the user terminal; the multidimensional user information table includes the multidimensional user information and a correspondence between the multidimensional user information and protocol types of existing connections of the user terminal.

Specifically, in this embodiment of the present invention, address pair information corresponding to an existing connection of the user terminal is an address pair consisting of a source IP address and a destination IP address of the existing connection, user terminal address information of an existing connection of the user terminal consists of an IP address and a port number that are of the user terminal corresponding to the existing connection, address information of a server that was accessed by the user terminal consists of an IP address and a port number that are of the server that was accessed by the user terminal, the protocol list of the user stores record information of protocols commonly used by the user, and the behavior characteristic information of existing connections of the user terminal includes protocol characteristics corresponding to the protocol types commonly used by the user, and behavior statistics of the user.

The first processing unit 603 is configured to: if the multidimensional user information corresponding to the user terminal is found, perform, according to information that is identified by the acquired multidimensional user information and about all connections that are currently established by the user terminal, multidimensional user information based protocol type identification on the connection on which the data packet is transmitted.

A protocol identification method that is performed based on multidimensional user information includes multiple independent identification methods, and no fixed order is required among the various identification methods. Each independent identification method is an identification method that is performed based on one dimension of information in the multidimensional user information, such as a protocol identification method that is performed based on server address information, a protocol identification method that is performed based on address pair information of existing connections of the user terminal, a protocol identification method that is performed based on user terminal address information of existing connections of the user terminal, a characteristic identification method based on existing connections of the user terminal, and a behavior identification method based on existing connections of the user terminal.

The first processing unit 603 is specifically configured to: determine whether server address information in a 5-tuple of the data packet is included in the address information that is stored in the multidimensional user information table and of servers that were accessed by the user terminal, where if yes, a protocol type of the connection on which the data packet is transmitted is a protocol type corresponding to an existing connection that is stored in the multidimensional user information table and whose server address information is consistent with that of the data packet; or determine whether source IP address information and destination IP address information in a 5-tuple of the data packet are included in the source IP address information and the destination IP address information that are stored in the multidimensional user information table and corresponding to existing connections of the user terminal, and if yes, continue to determine whether characteristic information of the data packet is included in the behavior characteristic information that is stored in the multidimensional user information table and of existing connections of the user terminal, where if yes, a protocol type of the connection on which the data packet is transmitted is a protocol type corresponding to an existing connection that is stored in the multidimensional user information table and whose source IP address information, destination IP address information, and behavior characteristic information are consistent with those of the data packet; or determine whether user terminal address information in 5-tuple of the data packet is included in the user terminal address information that is stored in the multidimensional user information table and of existing connections of the user terminal, where if yes, a protocol type of the connection on which the data packet is transmitted is a protocol type corresponding to an existing connection that is stored in the multidimensional user information table and whose user terminal address information is consistent with that of the data packet; or determine whether behavior statistics of the data packet and behavior statistics of a historical data packet are included in the behavior characteristic information that is stored in the multidimensional user information table and of existing connections of the user terminal, where if yes, a protocol type of the connection on which the data packet is transmitted is a protocol type corresponding to an existing connection that is stored in the multidimensional user information table and whose behavior characteristic information is consistent with that of the data packet.

The first processing unit 603 is further configured to: if the identification succeeds, update identification result data in the multidimensional user information table and output an identification result, where the identification result data is the identified protocol type of the connection on which the data packet is transmitted.

The first processing unit 603 is further configured to: if the identification succeeds, further determine whether the data packet is a packet that cannot be identified by using a characteristic, and if yes, collect user based behavior statistics, and update the behavior characteristic information that is in a user connection data table and of existing connections of the user terminal.

The second processing unit 604 is configured to: if the multidimensional user information corresponding to the user terminal is not found, perform, according to a packet characteristic of the data packet, data flow based protocol type identification on the connection on which the data packet is transmitted.

The second processing unit 604 is further configured to: if the multidimensional user information corresponding to the user terminal does not exist in the multidimensional user information table, add the multidimensional user information corresponding to the user terminal to the multidimensional user information table.

The second processing unit 604 is further configured to: if the identification succeeds, update the identification result data in the multidimensional user information table, and output the identification result.

If the protocol type of the data flow is not identified by the network device based on the multidimensional user information or if the multidimensional information of the user does not exist in the multidimensional user information table, the network device performs protocol identification based on the data flow. A flow based protocol identification method includes methods such as correlation identification, port identification, characteristic identification, and behavior identification. After the identification succeeds, an identification result that is of the connection and in a multidimensional user information table is also updated, and if the identification fails, an identification result of identification failure is output.

In conclusion, in the protocol type identification apparatus according to this embodiment of the present invention, multidimensional user information based protocol type identification is performed on a received data packet according to a protocol type of an existing connection of a user terminal, so that service control on a per user basis can be implemented, and the multidimensional user information based protocol type identification is combined with data flow based protocol type identification, so that identification accuracy of a DPI system can be increased and protocol identification performance can be improved.

Figure 7:
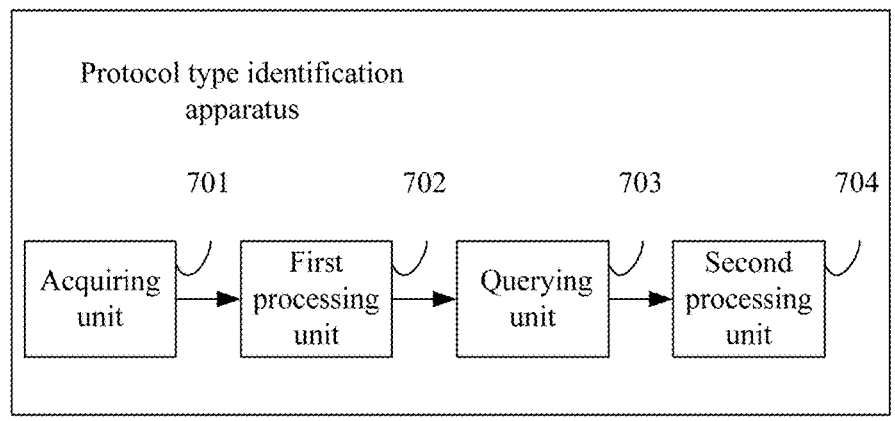
FIG. 7 is a schematic diagram of another protocol type identification apparatus according to an embodiment of the present invention.

Accordingly, an embodiment of the present invention further provides a protocol type identification apparatus, and FIG. 7 is a schematic diagram of another protocol type identification apparatus according to this embodiment of the present invention. The apparatus includes: an acquiring unit 701, a first processing unit 702, a querying unit 703, and a second processing unit 704.

The acquiring unit 701 is configured to acquire a data packet transmitted on a connection that is established between a user terminal and a server.

After a data packet of a data flow is received, the packet is parsed to obtain corresponding 5-tuple according to information in a packet header, where the 5-tuple includes a destination IP address, a destination port number, a source IP address, a source port number, and a Transport layer protocol that are of the packet, and then it is determined, according to the 5-tuple, whether a connection corresponding to the data flow is a newly-established connection.

Preferably, after receiving the data packet, a network device may query a flow table to determine whether 5-tuple connection record information corresponding to the 5-tuple of the data packet exists in the flow table, where if connection record information corresponding to the quintuple information of the service data packet exists in the flow table, it is determined that the connection corresponding to the data flow is an existing connection, and if connection record information corresponding to the quintuple information of the service data packet does not exist in the flow table, it is determined that the connection corresponding to the data flow is a newly-established connection.

After the flow table is queried, if it is determined that the connection, on which the data packet is transmitted, corresponding to the data flow is an existing connection, corresponding processing, for example, traffic control, is directly performed on the data packet according to protocol type identification result and a service processing method that are corresponding to the 5-tuple that is of the data packet and stored in the flow table. It should be noted that, although the connection on which the data packet is transmitted is an existing connection, the first processing unit 702 may also continue to perform a related operation, that is, data flow based protocol identification is performed on the connection on which the data packet is transmitted.

The first processing unit 702 is configured to perform, according to a packet characteristic of the data packet, data flow based protocol type identification on the connection on which the data packet is transmitted.

A data flow based protocol identification method includes methods such as correlation identification, port identification, characteristic identification, and behavior identification. After the identification succeeds, an identification result that is of the connection and in a multidimensional user information table is also updated, and if the identification fails, an identification result of identification failure is output.

The first processing unit 702 is further configured to: if the data flow based identification succeeds, perform corresponding service processing on the data packet.

The querying unit 703 is configured to: if the data flow based identification fails, query whether multidimensional user information corresponding to the user terminal exists in the multidimensional user information table, where the multidimensional user information is used to indicate information about all connections that are currently established by the user terminal.

The multidimensional user information corresponding to the user terminal includes at least one item of the following information: source IP address information and destination IP address information that are corresponding to current existing connections of the user terminal, user terminal address information of existing connections of the user terminal, address information of servers that were accessed by the user terminal, a protocol list of the user terminal, and behavior characteristic information of existing connections of the user terminal; the multidimensional user information table includes the multidimensional user information and a correspondence between the multidimensional user information and protocol types of existing connections of the user terminal.

The querying unit 703 is specifically configured to query, according to user terminal address information in the data packet, whether the multidimensional user information corresponding to the user terminal address information exists in the multidimensional user information table.

The second processing unit 704 is configured to: if the multidimensional user information corresponding to the user terminal is found, perform, according to information that is identified by the acquired multidimensional user information and about all connections that are currently established by the user terminal, multidimensional user information based protocol type identification on the connection on which the data packet is transmitted.

The second processing unit 704 is specifically configured to: determine whether server address information in a 5-tuple of the data packet is included in the address information that is stored in the multidimensional user information table and of servers that were accessed by the user terminal, where if yes, a protocol type of the connection on which the data packet is transmitted is a protocol type corresponding to an existing connection that is stored in the multidimensional user information table and whose server address information is consistent with that of the data packet; or determine whether source IP address information and destination IP address information in a 5-tuple of the data packet are included in the source IP address information and the destination IP address information that are stored in the multidimensional user information table and corresponding to existing connections of the user terminal, and if yes, continue to determine whether characteristic information of the data packet is included in the behavior characteristic information that is stored in the multidimensional user information table and of existing connections of the user terminal, where if yes, a protocol type of the connection on which the data packet is transmitted is a protocol type corresponding to an existing connection that is stored in the multidimensional user information table and whose source IP address information, destination IP address information, and behavior characteristic information are consistent with those of the data packet; or determine whether user terminal address information in 5-tuple of the data packet is included in the user terminal address information that is stored in the multidimensional user information table and of existing connections of the user terminal, where if yes, a protocol type of the connection on which the data packet is transmitted is a protocol type corresponding to an existing connection that is stored in the multidimensional user information table and whose user terminal address information is consistent with that of the data packet; or determine whether behavior statistics of the data packet and behavior statistics of a historical data packet are included in the behavior characteristic information that is stored in the multidimensional user information table and of existing connections of the user terminal, where if yes, a protocol type of the connection on which the data packet is transmitted is a protocol type corresponding to an existing connection that is stored in the multidimensional user information table and whose behavior characteristic information is consistent with that of the data packet.

The second processing unit 704 is further configured to: if the multidimensional user information corresponding to the user terminal does not exist in the multidimensional user information table, add the multidimensional user information corresponding to the user terminal to the multidimensional user information table.

The second processing unit 704 is further configured to: if the identification based on multidimensional user information succeeds, update identification result data in the multidimensional user information table and output an identification result.

The second processing unit 704 is further configured to: if the identification based on multidimensional user information succeeds, further determine whether the data packet is a packet that cannot be identified by using a characteristic, and if yes, collect user based behavior statistics, and update the behavior characteristic information that is in a user connection data table and of existing connections of the user terminal.

In conclusion, in this embodiment of the present invention, multidimensional user information based protocol identification is implemented, so that service control on a per user basis can be implemented, and in addition, identification accuracy of a DPI system can be increased and protocol identification performance can be improved.

Figure 8:
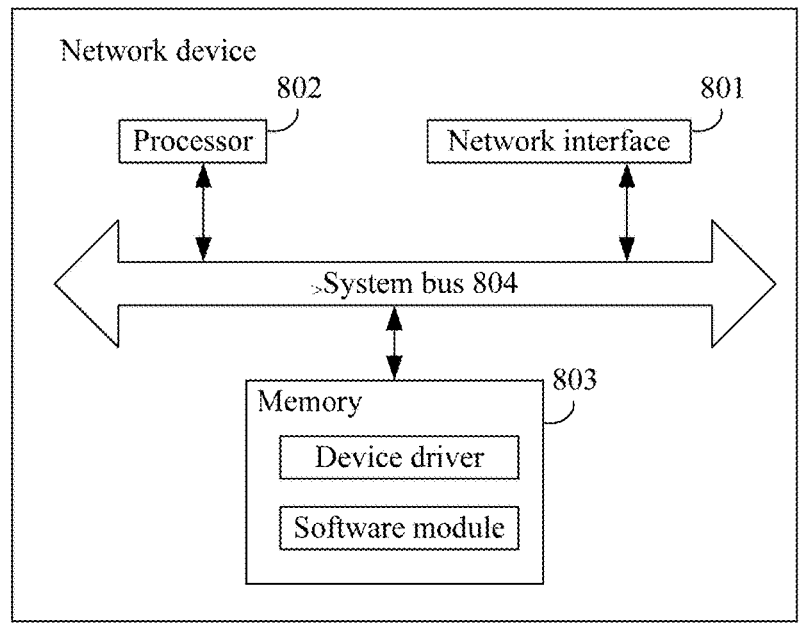
FIG. 8 is a schematic diagram of a network device according to an embodiment of the present invention.

Accordingly, an embodiment of the present invention further provides a network device, and FIG. 8 is a schematic diagram of the network device according to this embodiment of the present invention. As shown in the figure, the network device includes a network interface 801, a processor 802, and a memory 803. A system bus 804 is configured to connect the network interface 801, the processor 802, and the memory 803.

The network interface 801 is configured to connect to a user terminal device, a server side device, and another network device.

The memory 803 may be a permanent memory such as a hard disk drive and a flash memory, and the memory 803 has a software module and a device driver. The software module can execute various functional modules of the foregoing method of the present invention, and the device driver may be a network and interface driver.

When being started, these software modules are loaded into the memory 803, and then are accessed by the processor 802 and execute the following instructions:

acquiring a data packet transmitted on a connection that is established between a user terminal and a server;

querying whether multidimensional user information corresponding to the user terminal exists in a multidimensional user information table, where the multidimensional user information is used to indicate information about all connections that are currently established by the user terminal;

if the multidimensional user information corresponding to the user terminal is found, performing, according to information that is identified by the acquired multidimensional user information and about all connections that are currently established by the user terminal, multidimensional user information based protocol type identification on the connection on which the data packet is transmitted; and if the multidimensional user information corresponding to the user terminal is not found, performing, according to a packet characteristic of the data packet, data flow based protocol type identification on the connection on which the data packet is transmitted.

The multidimensional user information corresponding to the user terminal includes at least one item of the following information: source IP address information and destination IP address information that are corresponding to current existing connections of the user terminal, user terminal address information of existing connections of the user terminal, address information of servers that were accessed by the user terminal, a protocol list of the user terminal, and behavior characteristic information of existing connections of the user terminal; the multidimensional user information table includes the multidimensional user information and a correspondence between the multidimensional user information and protocol types of existing connections of the user terminal.

Further, the process in which the processor 802 queries whether the multidimensional user information corresponding to the user terminal exists in the multidimensional user information table specifically includes: querying, according to user terminal address information in the data packet, whether the multidimensional user information corresponding to the user terminal address information exists in the multidimensional user information table.

Further, after querying whether the multidimensional user information corresponding to the user terminal exists in the multidimensional user information table, the processor 802 further executes the following instructions: if the multidimensional user information corresponding to the user terminal does not exist in the multidimensional user information table, adding the multidimensional user information corresponding to the user terminal to the multidimensional user information table.

Further, the process in which the processor 802 performs, according to information that is identified by the acquired multidimensional user information and about all connections that are currently established by the user terminal, multidimensional user information based protocol type identification on the connection on which the data packet is transmitted is specifically: determining whether server address information in a 5-tuple of the data packet is included in the address information that is stored in the multidimensional user information table and of servers that were accessed by the user terminal, where if yes, a protocol type of the connection on which the data packet is transmitted is a protocol type corresponding to an existing connection that is stored in the multidimensional user information table and whose server address information is consistent with that of the data packet; or determining whether source IP address information and destination IP address information in a 5-tuple of the data packet are included in the source IP address information and the destination IP address information that are stored in the multidimensional user information table and corresponding to existing connections of the user terminal, and if yes, continuing to determine whether characteristic information of the data packet is included in the behavior characteristic information that is stored in the multidimensional user information table and of existing connections of the user terminal, where if yes, a protocol type of the connection on which the data packet is transmitted is a protocol type corresponding to an existing connection that is stored in the multidimensional user information table and whose source IP address information, destination IP address information, and behavior characteristic information are consistent with those of the data packet; or determining whether user terminal address information in 5-tuple of the data packet is included in the user terminal address information that is stored in the multidimensional user information table and of existing connections of the user terminal, where if yes, a protocol type of the connection on which the data packet is transmitted is a protocol type corresponding to an existing connection that is stored in the multidimensional user information table and whose user terminal address information is consistent with that of the data packet; or determining whether behavior statistics of the data packet and behavior statistics of a historical data packet are included in the behavior characteristic information that is stored in the multidimensional user information table and of existing connections of the user terminal, where if yes, a protocol type of the connection on which the data packet is transmitted is a protocol type corresponding to an existing connection that is stored in the multidimensional user information table and whose behavior characteristic information is consistent with that of the data packet.

Further, after performing, based on the multidimensional user information, the protocol type identification on the connection on which the data packet is transmitted and after accessing the memory 803, the processor 802 further executes the following instruction: if the identification succeeds, updating identification result data in the multidimensional user information table and outputting an identification result, where the identification result data is the identified protocol type of the connection on which the data packet is transmitted.

Further, after performing, according to information that is identified by the acquired multidimensional user information and about all connections that are currently established by the user terminal, the multidimensional user information based protocol type identification on the connection on which the data packet is transmitted, the processor 802 accesses the memory 803 and executes an instruction: if the identification succeeds, updating the identification result data in the multidimensional user information table, and outputting the identification result.

Further, after performing, according to an acquired protocol type that is identified by the multidimensional user information and of existing connections of the user terminal, the multidimensional user information based protocol type identification on the connection on which the data packet is transmitted, the processor 802 accesses the memory 803 and executes an instruction: if the identification succeeds, further determining whether the data packets is a packet that cannot be identified by using a characteristic, and if yes, collecting user based behavior statistics, and updating the behavior characteristic information that is in a user connection data table and of existing connections of the user terminal.

In conclusion, according to the network device provided in this embodiment of the present invention, multidimensional user information based protocol type identification is performed on a received data packet according to a protocol type of an existing connection of a user terminal, so that service control on a per user basis can be implemented, and the multidimensional user information based protocol type identification is combined with data flow based protocol type identification, so that identification accuracy of a DPI system can be increased and protocol identification performance can be improved.

Figure 9:
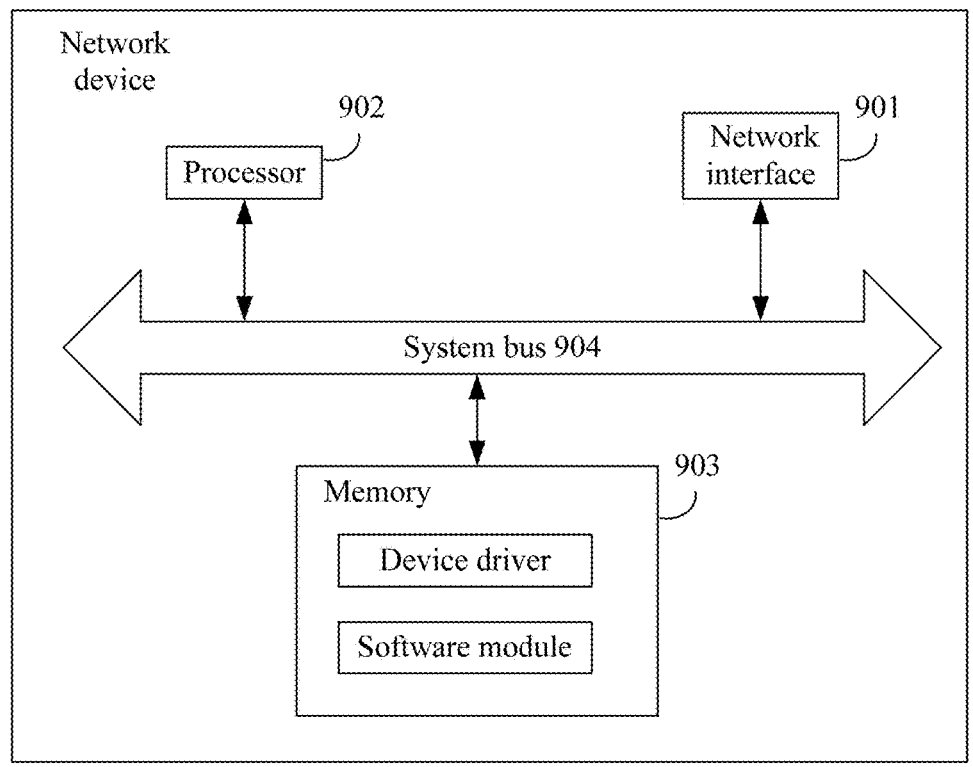
FIG. 9 is a schematic diagram of another network device according to an embodiment of the present invention.

Accordingly, an embodiment of the present invention further provides a network device, and FIG. 9 is a schematic diagram of the network device according to this embodiment of the present invention. As shown in the figure, the network device includes a network interface 901, a processor 902, and a memory 903. A system bus 904 is configured to connect the network interface 901, the processor 902, and the memory 903.

The network interface 901 is configured to connect to a user terminal device, a server side device, and another network device.

The memory 903 may be a permanent memory such as a hard disk drive and a flash memory, and the memory 903 has a software module and a device driver. The software module can execute various functional modules of the foregoing method of the present invention, and the device driver may be a network and an interface driver.

When being started, these software modules are loaded into the memory 903, and then are accessed by the processor 902 and execute the following instructions:
acquiring a data packet transmitted on a connection that is established between a user terminal and a server;
performing, according to a packet characteristic of the data packet, data flow based protocol type identification on the connection on which the data packet is transmitted;
if the data flow based identification fails, querying whether multidimensional user information corresponding to the user terminal exists in a multidimensional user information table, where the multidimensional user information is used to indicate information about all connections that are currently established by the user terminal; and
if the multidimensional user information corresponding to the user terminal is found, performing, according to information that is identified by the acquired multidimensional user information and about all connections that are currently established by the user terminal, multidimensional user information based protocol type identification on the connection on which the data packet is transmitted.

The multidimensional user information corresponding to the user terminal includes at least one item of the following information: source IP address information and destination IP address information that are corresponding to current existing connections of the user terminal, user terminal address information of existing connections of the user terminal, address information of servers that were accessed by the user terminal, a protocol list of the user terminal, and behavior characteristic information of existing connections of the user terminal; the multidimensional user information table includes the multidimensional user information and a correspondence between the multidimensional user information and protocol types of existing connections of the user terminal.

Further, the process in which the processor 902 queries whether the multidimensional user information corresponding to the user terminal exists in the multidimensional user information table specifically includes: querying, according to user terminal address information in the data packet, whether the multidimensional user information corresponding to the user terminal address information exists in the multidimensional user information table.

Further, after querying whether the multidimensional user information corresponding to the user terminal exists in the multidimensional user information table and after accessing the memory 903, the processor 902 further executes the following instruction: if the multidimensional user information corresponding to the user terminal does not exist in the multidimensional user information table, adding the multidimensional user information corresponding to the user terminal to the multidimensional user information table.

Further, the process in which the processor 902 performs, according to information that is identified by the acquired multidimensional user information and about all connections that are currently established by the user terminal, multidimensional user information based protocol type identification on the connection on which the data packet is transmitted is specifically: determining whether server address information in a 5-tuple of the data packet is included in the address information that is stored in the multidimensional user information table and of servers that were accessed by the user terminal, where if yes, a protocol type of the connection on which the data packet is transmitted is a protocol type corresponding to an existing connection that is stored in the multidimensional user information table and whose server address information is consistent with that of the data packet; or determining whether source IP address information and destination IP address information in a 5-tuple of the data packet are included in the source IP address information and the destination IP address information that are stored in multidimensional user information table and corresponding to existing connections of the user terminal, and if yes, continuing to determine whether characteristic information of the data packet is included in the behavior characteristic information that is stored in the multidimensional user information table and of existing connections of the user terminal, where if yes, a protocol type of the connection on which the data packet is transmitted is a protocol type corresponding to an existing connection that is stored in the multidimensional user information table and whose source IP address information, destination IP address information, and behavior characteristic information are consistent with those of the data packet; or determining whether user terminal address information in 5-tuple of the data packet is included in the user terminal address information that is stored in the multidimensional user information table and of existing connections of the user terminal, where if yes, a protocol type of the connection on which the data packet is transmitted is a protocol type corresponding to an existing connection that is stored in the multidimensional user information table and whose user terminal address information is consistent with that of the data packet; or determining whether behavior statistics of the data packet and behavior statistics of a historical data packet are included in the behavior characteristic information that is stored in the multidimensional user information table and of existing connections of the user terminal, where if yes, a protocol type of the connection on which the data packet is transmitted is a protocol type corresponding to an existing connection that is stored in the multidimensional user information table and whose behavior characteristic information is consistent with that of the data packet.

Further, after performing, according to information that is identified by the acquired multidimensional user information and about all connections that are currently established by the user terminal, the multidimensional user information based protocol type identification on the connection on which the data packet is transmitted and after accessing the memory 903, the processor 902 further executes the following instruction: if the identification based on multidimensional user information succeeds, updating identification result data in the multidimensional user information table and outputting an identification result.

Further, after performing the data flow based protocol type identification on the connection on which the data packet is transmitted, the processor 902 accesses the memory 903 and executes an instruction: if the data flow based identification succeeds, performing corresponding service processing on the data packet.

Further, after performing, based on the multidimensional user information, the protocol type identification on the connection on which the data packet is transmitted, the processor 902 accesses the memory 903 and executes an instruction: if the identification based on multidimensional user information succeeds, further determining whether the data packets is a packet that cannot be identified by using a characteristic, and if yes, collecting user based behavior statistics, and updating the behavior characteristic information that is in a user connection data table and of existing connections of the user terminal.

In conclusion, according to the network device provided in this embodiment of the present invention, multidimensional user information based protocol type identification is performed on a received data packet according to a protocol type of an existing connection of a user terminal, so that service control on a per user basis can be implemented, and the multidimensional user information based protocol type identification is combined with data flow based protocol type identification, so that identification accuracy of a DPI system can be increased and protocol identification performance can be improved.

A person skilled in the art may be further aware that the exemplary units and algorithm steps described with reference to the embodiments disclosed in this specification can be implemented by electronic hardware, computer software, or a combination thereof. To clearly describe the interchangeability between the hardware and the software, the foregoing has generally described compositions and steps of each example according to functions. Whether these functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objectives, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A protocol type identification method, the method comprising:
    acquiring a data packet transmitted on a connection established between a user terminal and a server;
    querying whether multidimensional user information corresponding to the user terminal exists in a multidimensional user information table for indicating information about all connections that are currently established by the user terminal;
    when the multidimensional user information corresponding to the user terminal is found, performing, according to information that is identified by the found multidimensional user information, multidimensional user information based protocol type identification on the connection on which the data packet is transmitted, comprising:
when server address information in a 5-tuple of the data packet is comprised in the address information that is stored in the multidimensional user information table and of servers that were accessed by the user terminal, determining that a protocol type of the connection on which the data packet is transmitted is a protocol type corresponding to an existing connection that is stored in the multidimensional user information table and whose server address information is consistent with that of the data packet;
when the multidimensional user information corresponding to the user terminal is not found, performing, according to a packet characteristic of the data packet, data flow based protocol type identification on the connection.

2. The protocol type identification method according to claim 1, wherein the multidimensional user information corresponding to the user terminal comprises at least one item of the following information:
source IP address information and destination IP address information that are corresponding to current existing connections of the user terminal;
user terminal address information of existing connections of the user terminal;
address information of servers that were accessed by the user terminal;
a protocol list of the user terminal; and
behavior characteristic information of existing connections of the user terminal; and
the multidimensional user information table comprises the multidimensional user information and a correspondence between the multidimensional user information and protocol types of existing connections of the user terminal.

3. A network device, comprising:
a processor; and
a memory coupled to the processor, the memory comprising instructions that, when executed by the processor, cause the network device to:
acquire a data packet transmitted on a connection that is established between a user terminal and a server;
query whether multidimensional user information corresponding to the user terminal exists in a multidimensional user information table for indicating information about all connections that are currently established by the user terminal;
when the multidimensional user information corresponding to the user terminal is found, perform, according to information that is identified by the found multidimensional user information, multidimensional user information based protocol type identification on the connection on which the data packet is transmitted;
when the multidimensional user information corresponding to the user terminal is not found, perform, according to a packet characteristic of the data packet, data flow based protocol type identification on the connection on which the data packet is transmitted; and
when server address information in a 5-tuple of the data packet is comprised in the address information that is stored in the multidimensional user information table and of servers that were accessed by the user terminal, a protocol type of the connection on which the data packet is transmitted is a protocol type corresponding to an existing connection that is stored in the multidimensional user information table and whose server address information is consistent with that of the data packet.

4. A protocol type identification method, the method comprising:
acquiring a data packet transmitted on a connection established between a user terminal and a server;
querying whether multidimensional user information corresponding to the user terminal exists in a multidimensional user information table for indicating information about all connections that are currently established by the user terminal;
when the multidimensional user information corresponding to the user terminal is found, performing, according to information that is identified by the found multidimensional user information, multidimensional user information based protocol type identification on the connection on which the data packet is transmitted;
when the multidimensional user information corresponding to the user terminal is not found, performing, according to a packet characteristic of the data packet, data flow based protocol type identification on the connection; and
when the identification succeeds, updating identification result data in the multidimensional user information table and outputting an identification result, wherein the identification result data is the identified protocol type of the connection on which the data packet is transmitted.

5. A network device, comprising:
a processor; and
a memory coupled to the processor, the memory comprising instructions that, when executed by the processor, cause the network device to:
acquire a data packet transmitted on a connection that is established between a user terminal and a server;
query whether multidimensional user information corresponding to the user terminal exists in a multidimensional user information table for indicating information about all connections that are currently established by the user terminal;
when the multidimensional user information corresponding to the user terminal is found, perform, according to information that is identified by the found multidimensional user information, multidimensional user information based protocol type identification on the connection on which the data packet is transmitted;
when the multidimensional user information corresponding to the user terminal is not found, perform, according to a packet characteristic of the data packet, data flow based protocol type identification on the connection on which the data packet is transmitted; and
when the multidimensional user information corresponding to the user terminal does not exist in the multidimensional user information table, add the multidimensional user information corresponding to the user terminal to the multidimensional user information table.

6. The network device according to claim 5, wherein the multidimensional user information corresponding to the user terminal comprises at least one item of the following information:

source IP address information and destination IP address information that are corresponding to current existing connections of the user terminal;
user terminal address information of existing connections of the user terminal;
address information of servers that were accessed by the user terminal;
a protocol list of the user terminal; and
behavior characteristic information of existing connections of the user terminal; and
the multidimensional user information table comprises the multidimensional user information and a correspondence between the multidimensional user information and protocol types of existing connections of the user terminal.

7. A network device, comprising:
a processor, and
a memory coupled to the processor, the memory comprising instructions that, when executed by the processor, cause the network device to:
  acquire a data packet transmitted on a connection that is established between a user terminal and a server;
  query whether multidimensional user information corresponding to the user terminal exists in a multidimensional user information table for indicating information about all connections that are currently established by the user terminal;
  when the multidimensional user information corresponding to the user terminal is found, perform, according to information that is identified by the found multidimensional user information, multidimensional user information based protocol type identification on the connection on which the data packet is transmitted;
  when the multidimensional user information corresponding to the user terminal is not found, perform, according to a packet characteristic of the data packet, data flow based protocol type identification on the connection on which the data packet is transmitted; and
  when the identification succeeds, update identification result data in the multidimensional user information table and output an identification result, wherein the identification result data is the identified protocol type of the connection on which the data packet is transmitted.

8. A network device, comprising:
a processor; and
a memory coupled to the processor, the memory comprising instructions that, when executed by the processor, cause the network device to:
  acquire a data packet transmitted on a connection that is established between a user terminal and a server;
  perform, according to a packet characteristic of the data packet, data flow based protocol type identification on the connection on which the data packet is transmitted;
  when the data flow based identification fails, query whether multidimensional user information corresponding to the user terminal exists in a multidimensional user information table for indicating information about all connections that are currently established by the user terminal;
  when the multidimensional user information corresponding to the user terminal is found, perform, according to information that is identified by the found multidimensional user information, multidimensional user information based protocol type identification on the connection; and
  when the identification succeeds, update identification result data in the multidimensional user information table and output an identification result, wherein the identification result data is the identified protocol type of the connection on which the data packet is transmitted.

9. The network device according to claim 8, wherein the multidimensional user information corresponding to the user terminal comprises at least one item of the following information:
source IP address information and destination IP address information that are corresponding to current existing connections of the user terminal;
user terminal address information of existing connections of the user terminal;
address information of servers that were accessed by the user terminal;
a protocol list of the user terminal; and
behavior characteristic information of existing connections of the user terminal; and
the multidimensional user information table comprises the multidimensional user information and a correspondence between the multidimensional user information and protocol types of existing connections of the user terminal.

* * * * *